(12) United States Patent
Gorelik

(10) Patent No.: US 7,680,828 B2
(45) Date of Patent: Mar. 16, 2010

(54) METHOD AND SYSTEM FOR FACILITATING DATA RETRIEVAL FROM A PLURALITY OF DATA SOURCES

(75) Inventor: Alexander Gorelik, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 11/499,442

(22) Filed: Aug. 4, 2006

(65) Prior Publication Data

US 2006/0271528 A1   Nov. 30, 2006

Related U.S. Application Data

(63) Continuation-in-part of application No. 10/938,205, filed on Sep. 9, 2004, now Pat. No. 7,426,520.

(60) Provisional application No. 60/502,043, filed on Sep. 10, 2003.

(51) Int. Cl.
*G06F 17/30* (2006.01)
(52) U.S. Cl. ............... 707/104.1; 707/201; 715/200
(58) Field of Classification Search .............. None
See application file for complete search history.

(56) References Cited

U.S. PATENT DOCUMENTS

| | | | |
|---|---|---|---|
| 5,615,341 A * | 3/1997 | Agrawal et al. | 705/10 |
| 5,675,785 A | 10/1997 | Hall et al. | |
| 5,806,066 A | 9/1998 | Golshani et al. | |
| 5,809,297 A | 9/1998 | Kroenke et al. | |
| 5,978,796 A * | 11/1999 | Malloy et al. | 707/3 |
| 6,026,392 A | 2/2000 | Kouchi et al. | |
| 6,049,797 A * | 4/2000 | Guha et al. | 707/6 |
| 6,092,064 A * | 7/2000 | Aggarwal et al. | 707/6 |
| 6,112,198 A | 8/2000 | Lohman et al. | |
| 6,182,070 B1 * | 1/2001 | Megiddo et al. | 707/6 |
| 6,185,549 B1 * | 2/2001 | Rastogi et al. | 706/45 |
| 6,226,649 B1 | 5/2001 | Bodamer et al. | |
| 6,272,478 B1 * | 8/2001 | Obata et al. | 706/12 |

(Continued)

FOREIGN PATENT DOCUMENTS

WO    0175679 A1    10/2001
WO    02073468 A1    9/2002

OTHER PUBLICATIONS

Principle of Object Oriented Programming, 5 pages.*

(Continued)

*Primary Examiner*—John R Cottingham
*Assistant Examiner*—Noosha Arjomandi
(74) *Attorney, Agent, or Firm*—Terry Carroll, SVL; IP Law

(57) ABSTRACT

A method and a system for facilitating data retrieval from a plurality of data sources are provided. A plurality of 'Local Data Objects' (LDOs) corresponding to the plurality of data sources are generated. Further, the plurality of LDOs are mapped onto a 'Global Data Object' (GDO). The GDO consolidates the plurality of LDOs into a single integrated model. The mapping of the LDOs onto the GDO includes a plurality of 'binding conditions' that relate LDO attributes to GDO attributes. The mapping also includes a plurality of 'transformation functions' for transforming the LDO attributes to the GDO attributes.

34 Claims, 19 Drawing Sheets

U.S. PATENT DOCUMENTS

| | | | |
|---|---|---|---|
| 6,301,575 B1 * | 10/2001 | Chadha et al. | 707/2 |
| 6,311,179 B1 * | 10/2001 | Agarwal et al. | 707/3 |
| 6,317,735 B1 * | 11/2001 | Morimoto | 707/2 |
| 6,339,775 B1 | 1/2002 | Zamanian et al. | |
| 6,393,424 B1 | 5/2002 | Hallman et al. | |
| 7,007,020 B1 * | 2/2006 | Chen et al. | 707/6 |
| 7,426,520 B2 | 9/2008 | Gorelik et al. | |
| 7,490,106 B2 * | 2/2009 | Dumitru et al. | 707/104.1 |
| 2002/0178170 A1 | 11/2002 | Britton et al. | |
| 2005/0055369 A1 | 3/2005 | Gorelik et al. | |
| 2009/0094274 A1 | 4/2009 | Gorelik et al. | |

OTHER PUBLICATIONS

Jacques Labrie et al. Using service data objects with enterprise information integraton technology, IBM.*

Richard T. BaldwinViews, objects, and persistence for accessing a high volume global data set, National Climatic Data Center.*

Informatica, The Data Integration Company, Enterprise Data Integration—Maximizing the Business Value of your Enterprise Data, Feb. 24, 2006.

Non-Final Office Action dated Sep. 11, 2007 cited in U.S. Appl. No. 10/938,205.

* cited by examiner

CustomerGDO

| Tables | Relation | Description |
|---|---|---|
| Customers | | Entity |
| Addresses | Customers.GID = Addresses.GID | Attribute |

702 — Tables row
704 — Addresses row

Mappings between GDO and LDOs

| GDO Table | GDO Column | LDO | LDO Table | LDO Binding Condition | LDO to GDO Transformation |
|---|---|---|---|---|---|
| Customers | GID | Customer LDO | Customers | CustomerGDO.Customers.Name == CustomerLDO.Customers.First \|\| ' ' \|\| CustomerLDO.Customers.Last | GID = DataRule (CustomerLDO_to_CustomerGDO, CustomerLDO.CustomerId) |
| | | Accounts LDO | Accounts | CustomerGDO.Customers.Name == AccountsLDO.Accounts.AccName | GID = DataRule (AccountsLDO_to_CustomerGDO, AccountsLDO.AccId) |
| Customers | Name | Customer LDO | Customers | CustomerGDO.Customers.Name == CustomerLDO.Customers.First \|\| ' ' \|\| CustomerLDO.Customers.Last | Name = DataRule (CustomerLDO_to_CustomerGDO, CustomerLDO.CustomerId) |
| | | Accounts LDO | Accounts | CustomerGDO.Customers.Name == AccountsLDO.Accounts.AccName | Name = DataRule (AccountsLDO_to_CustomerGDO, AccountsLDO.AccId) |

CustomerGDO

| Tables | Relation |
|---|---|
| Customers | |
| Addresses | Customers.GID = Addresses.GID |

702 — Tables row (Customers)
704 — Addresses row

Mappings between GDO and LDOs

| GDO Table | GDO Column | LDO | LDO Table | LDO Binding Condition | LDO to GDO Transformation |
|---|---|---|---|---|---|
| Customers | GID | Customer LDO | Customers | CustomerGDO.Customers.Name == CustomerLDO.Customers.FirstName \|\| ' ' \|\| CustomerLDO.Customers.LastName | GID = DataRule (CustomerLDO_to_CustomerGDO, CustomerLDO.CustomerId) |
| | | Accounts LDO | Accounts | CustomerGDO.Customers.Name == AccountsLDO.Accounts.AccName | GID = DataRule (AccountsLDO_to_CustomerGDO, AccountsLDO.AccId) |
| Customers | Name | Customer LDO | Customers | CustomerGDO.Customers.Name == CustomerLDO.Customers.FirstName \|\| ' ' \|\| CustomerLDO.Customers.LastName | Name = DataRule (CustomerLDO_to_CustomerGDO, CustomerLDO.CustomerId) |
| | | Accounts LDO | Accounts | CustomerGDO.Customers.Name == AccountsLDO.Accounts.AccName | Name = DataRule (AccountsLDO_to_CustomerGDO, AccountsLDO.AccId) |

Previous case:

Customers — 602

| CustomerID | First — 604 | Last — 606 |
|---|---|---|
| 11 | Nancy | Davolic |
| 14 | Johan | Loehr |
| 15 | Dexter | Fey |

Accounts — 618

| AccID — 616 | AccName |
|---|---|
| 1 | Nancy Davolic |
| 4 | Johan Loehr |
| 5 | Dexter Fey |

Natural key: First, Last, and AccName

Binding condition: Accounts.AccName = = Customers.First || ' ' || Customers.Last

Transformation: Accounts.AccName = Customers.First || ' ' || Customers.Last

New case:

Customers — 602

| CustomerID | FirstName — 1102 | LastName — 1104 |
|---|---|---|
| 11 | Nancy | Davolic |
| 14 | Johan | Loehr |
| 15 | Dexter | Fey |

Accounts — 618

| AccID — 616 | AccName |
|---|---|
| 1 | Nancy Davolic |
| 4 | Johan Loehr |
| 5 | Dexter Fey |

Impacted columns: FirstName, LastName

New natural key: FirstName, LastName, and AccName

New binding condition: Accounts.AccName = = Customers.FirstName || ' ' || Customers.LastName

New transformation: Accounts.AccName = Customers.FirstName || ' ' || Customers.LastName

FIG. 11b

METHOD AND SYSTEM FOR FACILITATING DATA RETRIEVAL FROM A PLURALITY OF DATA SOURCES

CROSS-REFERENCE TO RELATED APPLICATIONS

This is a continuation-in-part application of U.S. patent application Ser. No. 10/938,205 filed Sep. 9, 2004, titled 'A method and apparatus for semantic discovery and mapping between data sources', which claims priority under U.S. Provisional Patent Application Ser. No. 60/502,043 filed Sep. 10, 2003, titled 'A method and apparatus for semantic discovery and mapping between data sources', the disclosures of which are incorporated herein by reference for all purposes.

FIELD OF THE INVENTION

The invention relates generally to the field of data management systems. More specifically, the invention relates to a method and a system for integrating and mapping data from a plurality of data sources.

BACKGROUND OF THE INVENTION

In a typical enterprise, there are several different data management systems, such as an accounting data management system, a Customer Relationship Management (CRM) data management system, and an Enterprise Resource Planning (ERP) data management system. Each of these data management systems can have different data sources, where each of the data sources may include common data stored in a different format. As required, a data management system can be integrated with another data management system in various types of data-integration projects, for example, application integration, legacy migration, data source consolidation, master data consolidation, server consolidation, or other Information Technology (IT) initiatives. All these data-integration projects have their own set of software solutions designed to automate the corresponding data-integration. A software solution may be, for example, Data Warehousing (DW), Enterprise Application Integration (EAI), or Extract, Transform, Load (ETL).

Although the scope of data-integration projects can be different, all data-integration projects start by data mapping, which is the process of integrating and organizing data from disparate data management systems into a single platform for manipulation and evaluation. Data mapping facilitates availability of data of one data management system to other data management systems in an enterprise. As data is distributed and is stored in different formats across the several data management systems, inter-relations are not always explicitly available or readily determined. Therefore, data-integration projects require that data stored in one data management system be mapped to data stored in other data management systems.

While efforts to automate data mapping have been undertaken, in conventional methods of data-integration, the task of data mapping is still performed manually. Manual data mapping is very time-consuming and prone to human errors. The reliance on manual labor also increases the cost of such data-integration projects.

In light of the foregoing discussion, there is a need for a method and a system to automate the task of data mapping.

SUMMARY OF THE INVENTION

An objective of the invention is to facilitate data retrieval from a plurality of data sources.

Another objective of the invention is to automate the process of data mapping in data-integrating processes.

Yet another objective of the invention is to update data mappings when schemas of data sources change.

Still another objective of the invention is to update the schema changes asynchronously.

Yet another objective of the invention is to update the data mappings in value lookup tables when data in the data sources changes.

Yet another objective of the invention is to update the data changes asynchronously.

Still another objective of the invention is to update the data mappings in case of changes in the mapping logic of the existing data mappings.

An embodiment of the invention automates the process of data mapping by generating a plurality of 'Global Data Objects' (GDOs). Each GDO from the plurality of GDOs is a data model that consolidates a plurality of 'Local Data Objects' (LDOs) into a single integrated model. An LDO from the plurality of LDOs is a logical representation of relationships between a plurality of tables in a data source.

A GDO from the plurality of GDOs is generated by mapping a plurality of LDOs onto the GDO. To map the plurality of LDOs, a plurality of 'binding conditions' between the plurality of LDOs and the GDO is determined. The plurality of binding conditions relates LDO attributes to GDO attributes. On the basis of the determined plurality of binding conditions, a plurality of 'transformation functions' is determined for transforming the LDO attributes to the GDO attributes.

When a particular data is required, a GDO attribute corresponding to the particular data is referred to. The referred GDO attribute provides the information regarding a corresponding LDO attribute. Thereafter, the LDO attribute provides the information on how to retrieve the required data.

BRIEF DESCRIPTION OF THE DRAWINGS

Embodiments of the invention will hereinafter be described in conjunction with the appended drawings provided to illustrate and not to limit the invention, wherein like designations denote like elements, and in which:

FIG. 7 illustrates an exemplary representation of the GDO, in accordance with an embodiment of the invention;

FIGS. 11a and 11b illustrate an exemplary representation of an impact analysis, in accordance with an embodiment of the invention;

DESCRIPTION OF EMBODIMENTS OF THE INVENTION

Embodiments of the invention provide a method, a system and a computer program product for facilitating data retrieval from a plurality of data sources. In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Figure 1:
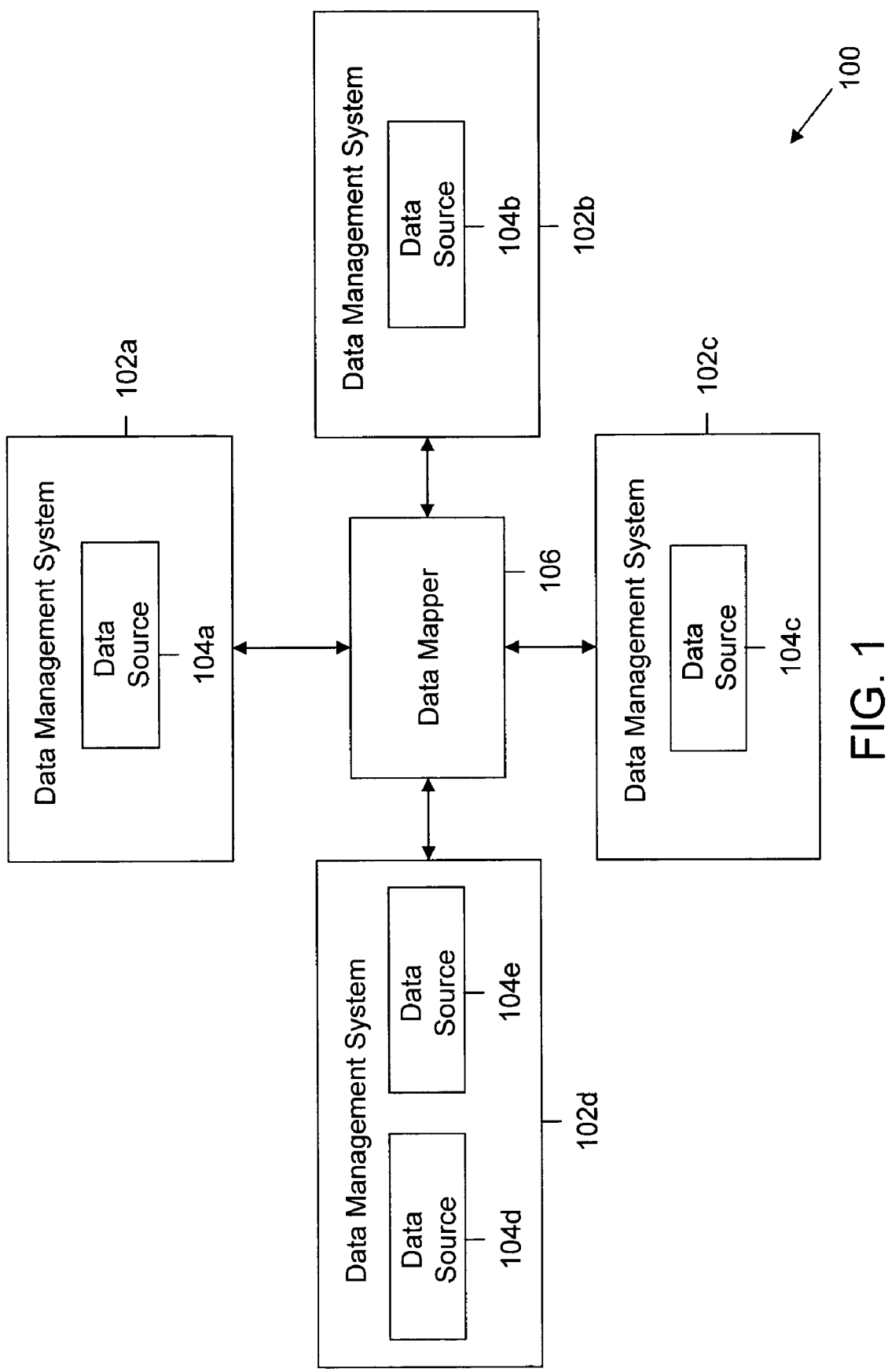
FIG. 1 illustrates an exemplary data management environment, where embodiments of the invention can be practiced.

FIG. 1 illustrates an exemplary data management environment for an enterprise 100, where embodiments of the invention can be practiced. Enterprise 100 includes data management systems 102a-d, data sources 104a-e, and a data mapper 106. Data management systems 102a-d and data sources 104a-d are hereinafter referred to as data management systems 102 and data sources 104, respectively.

Examples of enterprise 100 include, but are not limited to, a commercial enterprise, educational enterprise, or financial enterprise. Data management systems 102 may be, for example, accounting data management systems, Customer Relationship Management (CRM) data management systems, Enterprise Resource Planning (ERP) data management systems, or other data management systems. It is to be understood that the specific designation for data management systems 102 is for the convenience of the reader and is not to be construed as limiting enterprise 100 to a specific number of data management systems 102 or to specific types of data management systems 102 present in enterprise 100.

Data management systems 102 include data sources 104. For example, with reference to FIG. 1, data management system 102a includes data source 104a, data management system 102b includes data source 104b, data management system 102c includes data source 104c, and data management system 102d includes data source 104d and data source 104e.

Data sources 104 may be operational data sources, data-warehouse data sources or federated data sources. An operational data source is used in an operational data management system. The operational data management system accepts queries from a user, identifies the information on the basis of the queries, and returns the results to the user. The operational data management system also accepts updates from the user, and accordingly, updates data in the operational data source. Examples of operational data management systems include, but are not limited to, On Line Transaction Processing (OLTP) data management systems, custom-billing data management systems, and Management Information Systems (MISs). A data-warehouse data source is a data repository, which integrates data from various data management systems. Examples of data-warehouse data sources include, but are not limited to, data marts and enterprise data warehouses. A federated data source is used to make multiple operational and/or data-warehouse data sources appear as a single integrated data source. It is to be understood that the specific designation for data sources 104 is for the convenience of the reader and is not to be construed as limiting data management systems 102 to a specific number of data sources 104 or to specific types of data sources 104 present in data management systems 102.

Each data source 104 may include data in a different or proprietary format. For example, with reference to FIG. 1, data in data management system 102a may be in Data Base 2 (DB2) format, and data in data management system 102b may be in Oracle format. As required, a data management system from data management systems 102 is integrated with another data management system from data management systems 102 in a data-integration project. Data-integration projects may be undertaken for a variety of reasons or initiatives, such as, for example, application integration, legacy migration, data source consolidation, master data consolidation, server consolidation, sensitive data discovery and management, regulatory compliance, Mergers and Acquisitions (M&A), or other Information Technology (IT) initiatives.

The initial stage of any data-integration project involves integration and organization of data. The process of integration and organization of data is performed by data mapper 106. Data mapper 106 determines the relation between data stored in data sources 104 and then maps data.

Data mapper 106 is capable of mapping data from a source data management system to a target data management system. For example, data management system 102a can be the source data management system and data management system 102d can be the target data management system. Data mapper 106 physically connects to data management systems 102. In addition, data mapper 106 allows the user to select a plurality of data sources from data sources 104, and, thereby, maps data sources 104 in any combination. Continuing from the above example, the user may select data source 104a in data management system 102a as the source data source and data sources 104d and 104e in target data management system 102d as the target data sources.

Data in a data source from data sources 104 can be stored in various data tables. Data mapper 106 determines the relationships between the data tables by identifying primary keys and foreign keys in the data tables. The data tables and their relationships may be illustrated in the form of relationship graphs. A primary key is a set of attributes that uniquely identifies an entity, which is a certain unit of data that can be classified and has stated relationships to other entities. The primary key is unique, stable, and non-zero under all conditions. A foreign key of an entity in a data table provides referential information about the entity. The foreign key provides the relation between the entity in the data table and entities in other data tables. Further, a foreign key of one of the data tables can be a primary key of another data table. Details regarding entities, primary keys, and foreign keys have been provided in conjunction with FIG. 4.

Data mapper 106 identifies the relationships between the data tables on the basis of the identified primary and foreign keys. Data-table relationships are classified into an attribute relationship, a reference relationship, and a cross-reference relationship. The identification of the relationships between the data tables is incorporated herein by reference to U.S. patent application Ser. No. 10/938,205 filed Sep. 9, 2004 by Alexander Gorelik, et al.

In an attribute relationship, a parent table describes an entity, and a child table includes additional information about the entity. The parent table is a data table that links various child tables. The child tables and the parent table include at least one common column. The child tables will typically further include additional columns, in certain embodiments of the invention. In a reference relationship, a child table describes an entity, and the parent table includes reference information about the entity. In a cross-reference relationship between two entity tables, the two entity tables provide reference information about an entity. An entity table is a data table, wherein the primary key of the data table does not include any foreign key of other data tables.

Further, data mapper 106 identifies the data tables on the basis of the identified primary and foreign keys, and the identified relationships between the data tables.

Data tables in an operational data source can be classified into operational system tables, cross-reference tables, attribute tables, and entity tables. An operational system table is a data table that stores metadata of data tables of the operational data source. A cross-reference table is a data table, wherein the primary key of the data table includes foreign keys from other data tables. An attribute table is a data table, wherein a part of the primary key of the data table includes a foreign key of another data table.

Data tables in a data-warehouse data source can be classified into data-warehouse system tables, fact tables, dimension tables, reference tables, and attribute tables. A data-warehouse system table is a data table that stores metadata of data tables of the data-warehouse data source. A data-warehouse data source is often modeled as a star schema or a snowflake schema. In a star schema, dimension tables contain attributes and fact tables contain measurements. There is a primary-foreign key relationship between primary keys of dimension tables and foreign keys of a fact table. All the foreign keys in the fact table usually form the composite primary key for the fact table. Given the nature of the star schema, a fact table may be identified as a data table, wherein the number of foreign keys that form the primary key of the data table is more than a predefined key threshold value. The predefined key threshold value is a variable that can be system-defined or user-defined. A dimension table is a data table, wherein the primary key of the data table is a foreign key of a fact table. A snowflake schema is a variation of the star schema in which dimension tables are normalized into a number of tables. Such tables are identified as reference tables, wherein a primary key of a data table includes foreign keys of a dimension table.

As explained before, a federated data source includes multiple operational and/or data-warehouse data sources. Therefore, the federated data source may be either an operational data source or a data-warehouse data source.

The classification of data-table relationships is independent of the classification of the data tables. Details of the same have been provided in conjunction with FIGS. 2a and 2b, and FIGS. 3a and 3b.

In accordance with an embodiment of the invention, the user can identify the classification of the data tables. Further, the user can also identify the data-table relationships. Details of the identification and classification of the data-table relationships between the data tables are incorporated herein by reference to U.S. patent application Ser. No. 10/938,205 filed Sep. 9, 2004 by Alexander Gorelik, et al.

Further, data mapper 106 generates a 'Local Data Object' (LDO) on the basis of the identified data-table relationships and data-table types. Details of the generation of the LDO and its representation have been provided in conjunction with FIGS. 2a and 2b, and FIGS. 3a and 3b, respectively.

The LDO provides the logical representation of the relationships between the data tables in the data source. However, it should be noted that a data source can have multiple LDOs. It should also be noted that an LDO can correspond to only some data tables in the data source instead of all the data tables. For example, a data source can have three data tables, Customers, Addresses, and Orders. However, an LDO of the data source, CustomerLDO, corresponds only to the data tables, Customers and Addresses, while another LDO, Orders LDO, corresponds only to the data tables, Customers and Orders. Therefore, CustomerLDO provides the logical representation of the relationships between data related to customers, while OrderLDO provides the logical representation of the relationships between data related to orders.

The LDO has a root table that includes the natural key of an entity in the LDO. The natural key is a subset of attributes of the entity, which uniquely identifies the entity. The root table does not have any parent table. All other tables represented in the LDO are child tables related to the root table. The LDO includes parent-child relationship expressions of the data tables. The parent-child relationship expressions may be based on the primary-foreign key relationships between the data tables, for example, in case of a Relational Database Management System (RDBMS). The parent-child relationship expressions may be join relationships that are not based on referential integrity constraints. Referential integrity pertains to a feature in RDBMSs, which prevents the insertion of inconsistent records in data tables that are related by primary-foreign key relationships. A particular data table can be represented more than once in the same LDO. An example of the same has been provided in conjunction with FIG. 4.

Figure 2A:
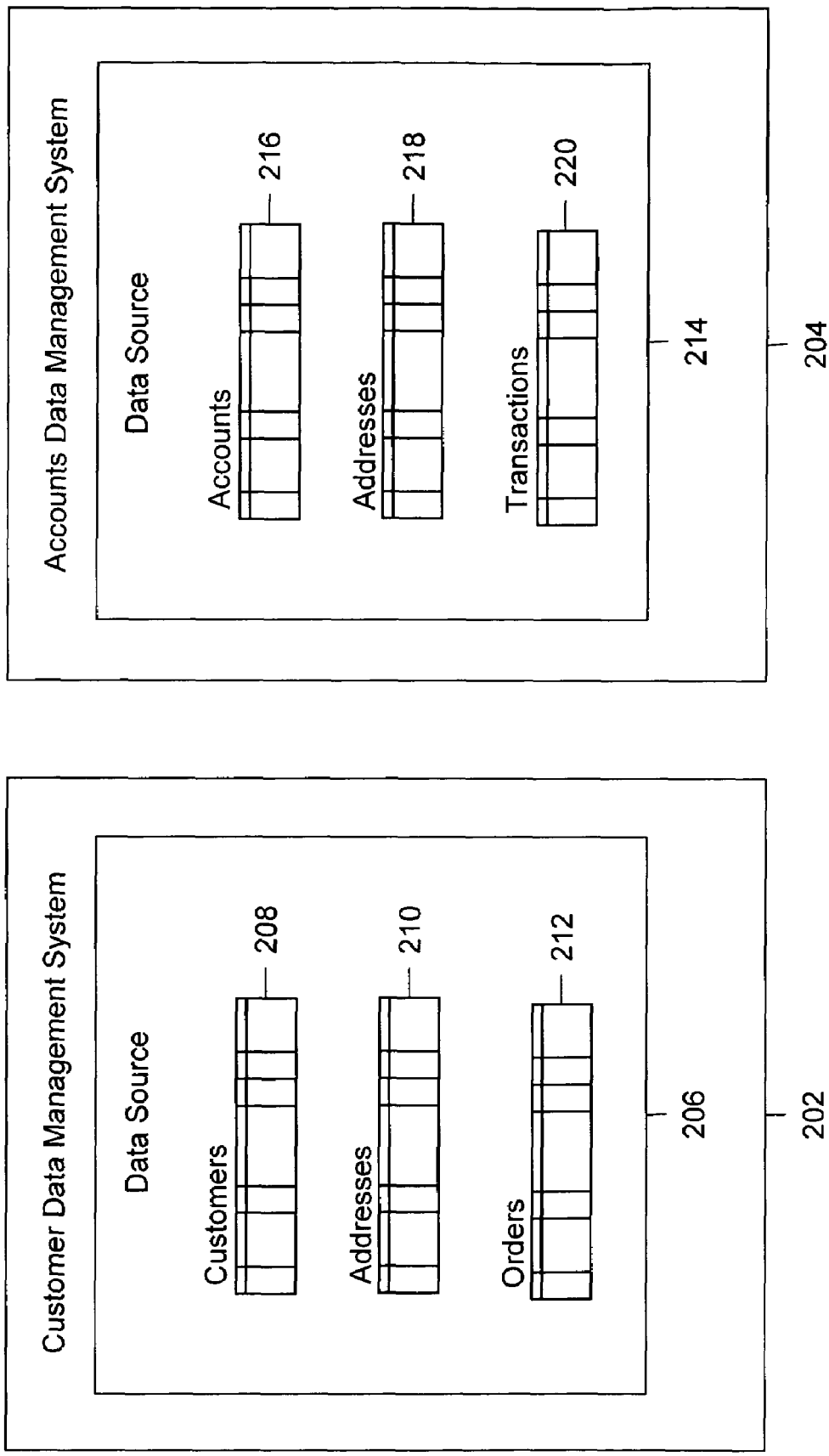
FIGS. 2a and 2b illustrate exemplary data management systems, in accordance with an embodiment of the invention.
Figure 2B:
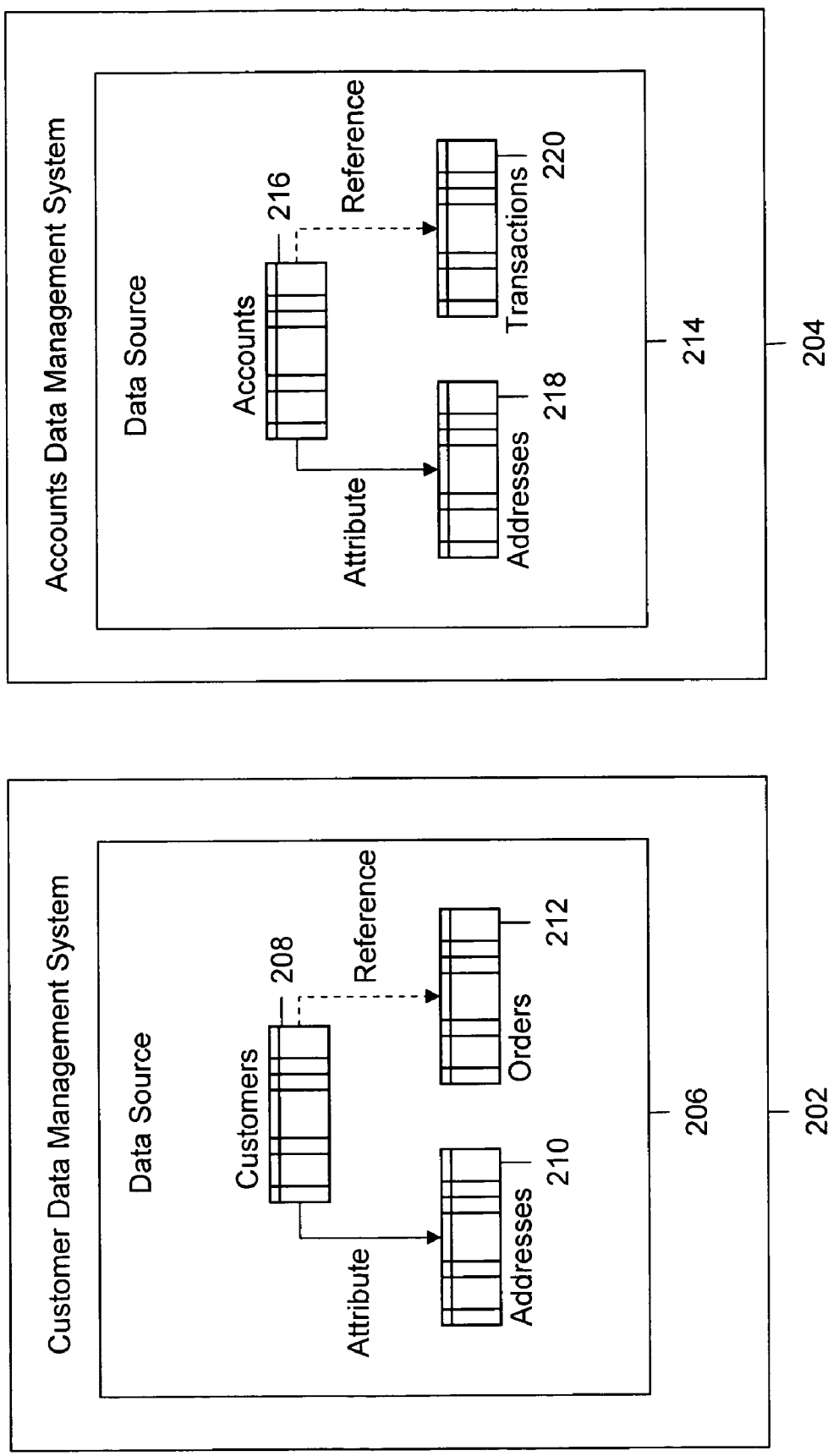

FIGS. 2a and 2b illustrate exemplary data management systems, Customer data management system 202 and Accounts data management system 204, in accordance with an embodiment of the invention. Customer data management system 202 includes a data source 206 that includes three data tables, Customers 208, Addresses 210 and Orders 212. Similarly, Accounts data management system 204 includes a data source 214 that includes three data tables, Accounts 216, Addresses 218 and Transactions 220.

Customers 208 is an entity table that provides the details of all the customers; Addresses 210 is an attribute table that provides the address details of the customers in Customers 208; and Orders 212 is also an entity table that provides the details of the orders placed by these customers. Therefore, data-table relationship between Customers 208 and Addresses 210 is an attribute relationship, and that between Customers 208 and Orders 212 is a reference relationship. Similarly, Accounts 216 is an entity table that provides the details of all the accounts; Addresses 218 is an attribute table that provides the address details of the account holders; and Transactions 220 is also an entity table that provides the details of the transactions performed by these account holders. Therefore, data-table relationship between Accounts 216 and Addresses 218 is an attribute relationship, and that between Accounts 216 and Transactions 220 is a reference relationship. Based on the data-table relationships identified above, data mapper 106 generates LDOs as a logical representation of relationships between the data tables. The generated LDOs can be represented in the form of tables.

Figure 3A:
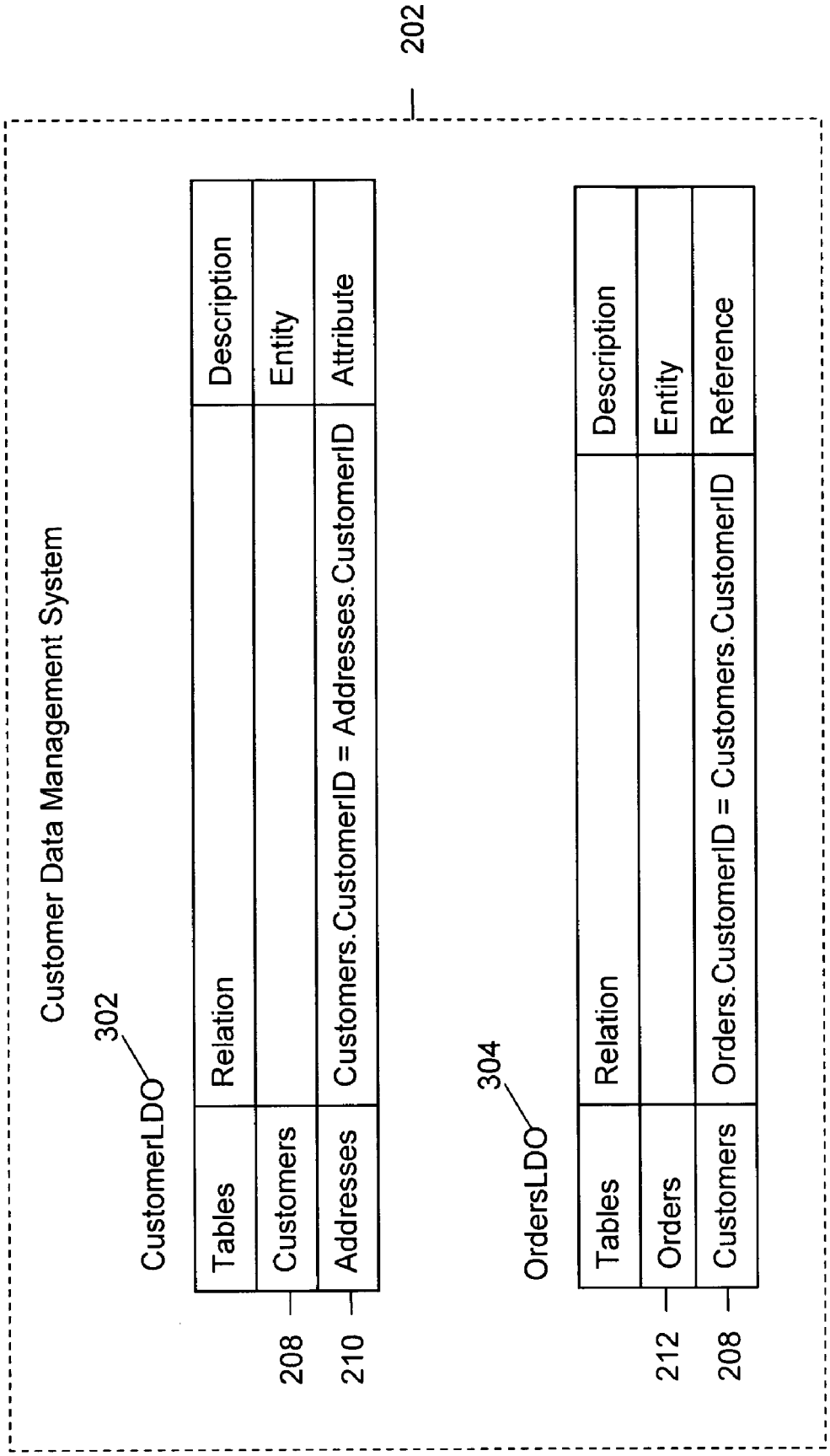
FIGS. 3a and 3b illustrate exemplary representations of Local Data Objects (LDOs), in accordance with an embodiment of the invention.
Figure 3B:
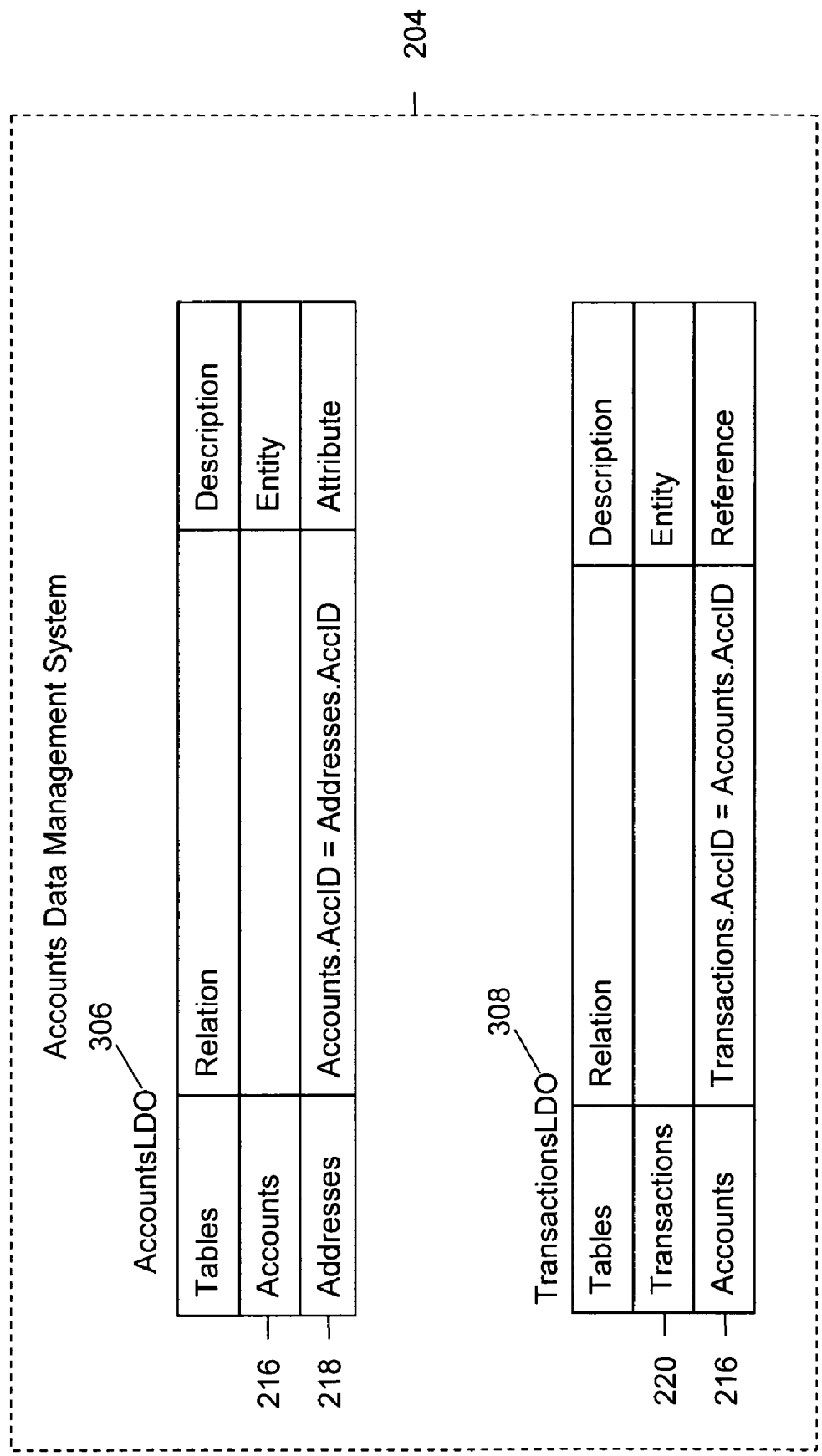

FIGS. 3a and 3b illustrate exemplary representations of the generated LDOs, in accordance with an embodiment of the invention. FIG. 3a illustrates two LDOs of Customer data management system 202, CustomerLDO 302 and Orders LDO 304, where CustomerLDO 302 includes Customers 208 and Addresses 210, and OrdersLDO 304 includes Orders 212 and Customers 208. The illustration of CustomerLDO 302 shows the data-table relationships between Customers 208 and Addresses 210, and that of OrdersLDO 304 shows the data-table relationships between Orders 212 and Customers 208. Similarly, FIG. 3b illustrates two LDOs of Accounts data management system 204, AccountsLDO 306 and TransactionsLDO 308, where AccountsLDO 306 includes Accounts 216 and Addresses 218, and TransactionsLDO 308 includes Transactions 220 and Accounts 216. The illustration of AccountsLDO 306 shows the data-table relationships between Accounts 216 and Addresses 218, and that of TransactionsLDO 308 shows the data-table relationships between Transactions 220 and Accounts 216.

Figure 4:
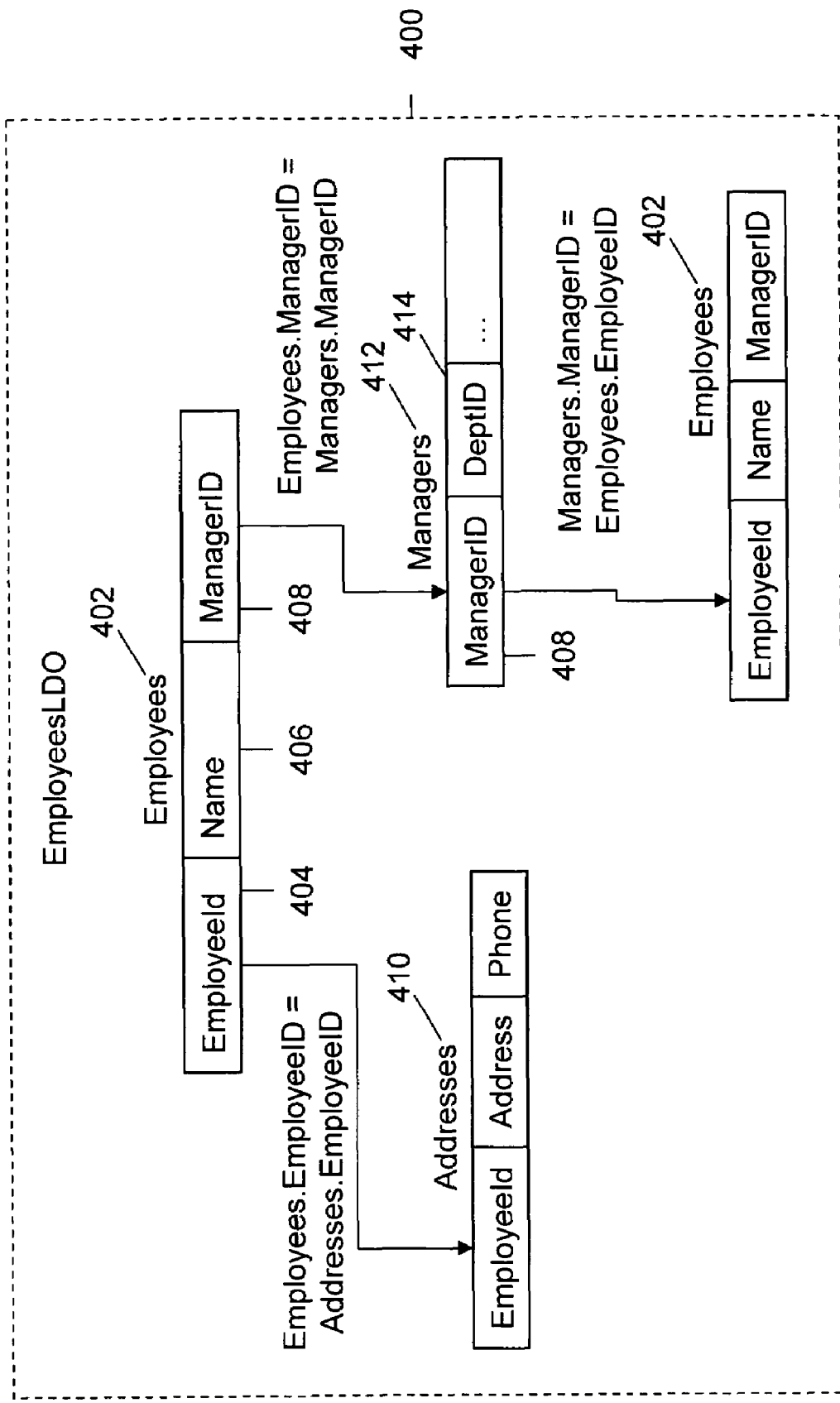
FIG. 4 illustrates an exemplary LDO, in accordance with an embodiment of the invention.

In certain scenarios, relationship graphs between data tables form loops. For example, a data table, Employees, may have a primary key, EmployeeID, and a foreign key, ManagerID, which is a foreign key to another data table, Managers, which, in turn has a foreign key to Employees. In this case, data mapper 106 generates an LDO by removing the loop (Employees->Managers->Employees) and including multiple instances of Employees along with different data-table relationships. FIG. 4 illustrates an exemplary LDO, EmployeesLDO 400, in accordance with an embodiment of the invention. The LDO, EmployeesLDO 400, has a data table, Employees 402, as its root. The data table, Employees 402, has three columns, EmployeeID 404, Name 406 and ManagerID 408, where EmployeeID 404 is the primary key of Employees 402 and uniquely identifies an employee of an organization, Name 406 represents the name of the employee, and ManagerID 408 represents a manager of the employee. Employee 402 is an entity table in which the entity is an employee. In EmployeesLDO 400, Employees 402 acts as a parent table to a child table, Addresses 410, in which the address details of all the employees is provided. Further, EmployeesLDO 400 includes a data table, Managers 412, in which the details of managers are provided. Manager 412 is also an entity table in which the entity is a manager. ManagerID 408 is a foreign key of Employees 402 and is a primary key of Managers 412.

In Managers 412, one of the columns is ManagerID 408. ManagerID 408 is the primary key of Managers 412 and uniquely identifies a manager in the organization. However, it should be noted that the managers are also the employees of the organization. Therefore, EmployeesLDO 400 includes Employees 402 as a child table of Managers 412, where Employees 402 provides the employee details of all the managers. In this way, Employees 402 is included twice in EmployeesLDO 400.

For example, if there is an employee, Bob Jones, with EmployeeID 404 of '1121', whose manager is Sylvia Ramiro with EmployeeID 404 of '170', the LDO instance for Bob Jones would contain a row for Bob Jones in the root instance of Employees 402 with EmployeeID 404 set to '1121', Name 406 set to 'Bob Jones', and ManagerID 408 set to '170'. Managers 412 would contain a row with ManagerID 408 set to '170', DeptID 414 set to 'IT', and so on. The second instance of Employees 402 would have the row with EmployeeID 404 set to '170', Name 406 set to 'Sylvia Ramiro', and ManagerID 408 set to the manager of Sylvia Ramiro.

As described above, data mapper 106 generates LDOs for all data sources 104. It should be noted that one data source can have several LDOs. For example, data source 206 included in Customer data management system 202 has two LDOs, CustomerLDO 302 and OrdersLDO 304.

A particular data table can be represented in more than one LDO. For example, Customers 208 has been represented in CustomerLDO 302 as well as OrdersLDO 304.

Further, data mapper 106 also generates a 'Global Data Object' (GDO). The GDO is a data object that corresponds to an entity. The GDO is a data model that consolidates a plurality of LDOs into a single integrated model. The GDO includes the relationships between the plurality of LDOs. Therefore, the plurality of LDOs are mapped onto the GDO. Details of the generation of the GDO and an exemplary representation of the mappings have been provided in conjunction with FIGS. 6 and 7.

Consider, for example, a GDO, CustomerGDO, includes relationships between two LDOs, CustomerLDO 302 and AccountsLDO 306. The logical representation of relationships between Customers 208 and Addresses 210 is provided by CustomerLDO 302. The logical representation of relationships between Accounts 216 and Addresses 218 is provided by AccountsLDO 306. In this way, CustomerLDO 302 and AccountsLDO 306 map onto CustomerGDO.

LDOs corresponding to data sources 104 can map onto a single GDO. However, it should be noted that there can be various GDOs for various entities in enterprise 100, for example, CustomerGDO, ProductsGDO, OrdersGDO and so forth.

Further, it should be noted that a single LDO can map onto different GDOs. For example, CustomerLDO 302 can map onto CustomerGDO as well as OrdersGDO.

The GDOs facilitate data retrieval from data sources 104 included in data management systems 102. When a particular data is required, the GDO corresponding to the particular data is referred to. Consider, for example, data from Addresses 210 is required. The information that the required data is available in Addresses 210, and is represented by CustomerLDO 302, is provided by CustomerGDO. Therefore, CustomerGDO provides the information on how to retrieve the required data.

Figure 5:
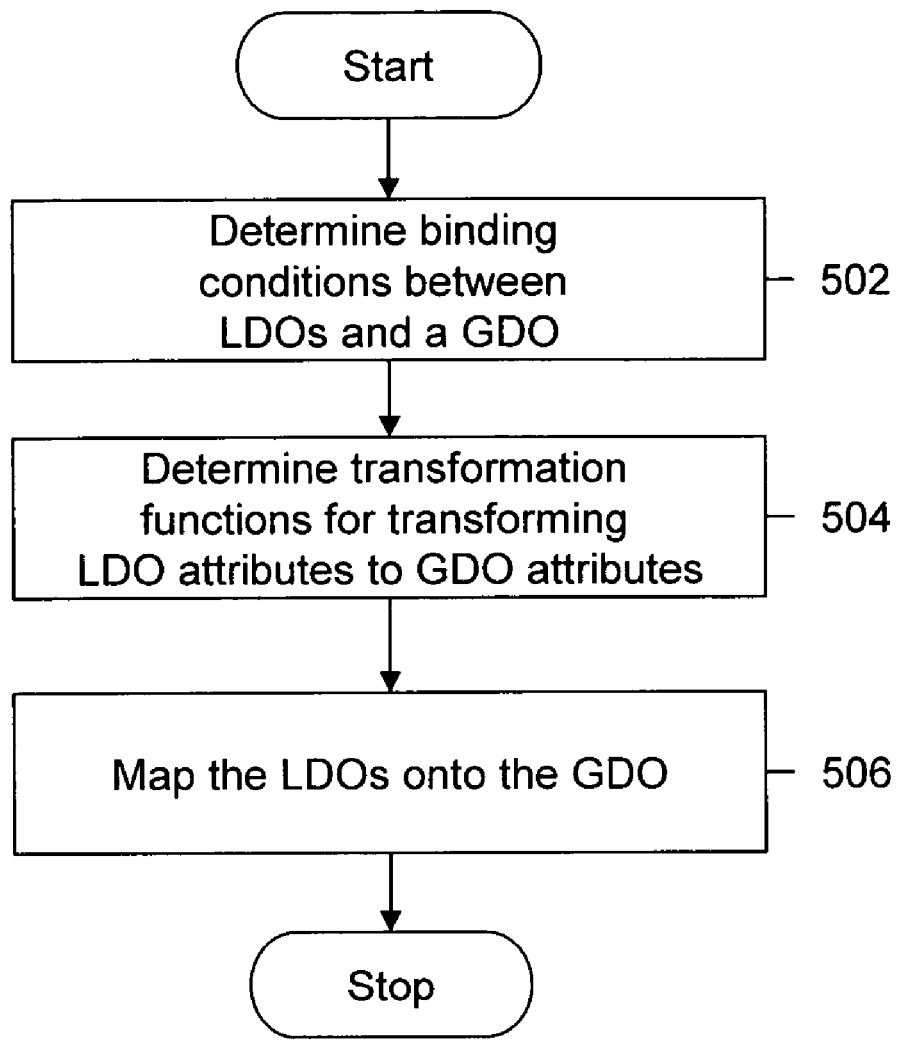
FIG. 5 is a flow diagram, illustrating a method for generating a Global Data Object (GDO), in accordance with an embodiment of the invention.

FIG. 5 is a flow diagram, illustrating a method for generating a GDO, in accordance with an embodiment of the invention. At step 502, data mapper 106 determines 'binding conditions' between each LDO from the plurality of LDOs and the GDO. The binding conditions can be determined by matching instances of natural keys of data tables in each LDO from the plurality of LDOs and the GDO.

At step 504, data mapper 106 determines 'transformation functions' for transforming LDO attributes to GDO attributes. The transformation functions are determined on the basis of the determined binding conditions.

The binding conditions are identification relationships between instances of each LDO from the plurality of LDOs and the GDO. Therefore, the binding conditions can be used to identify relationships between instances of an LDO from the plurality of LDOs, and the GDO. The binding conditions are used to identify the same instance by matching the LDO attributes with the GDO attributes.

After the determination of the binding conditions and the transformation functions, step 506 is performed. At step 506, data mapper 106 maps the plurality of LDOs onto the GDO. Steps 502 to 506 have been explained in conjunction with FIG. 6.

Figure 6:
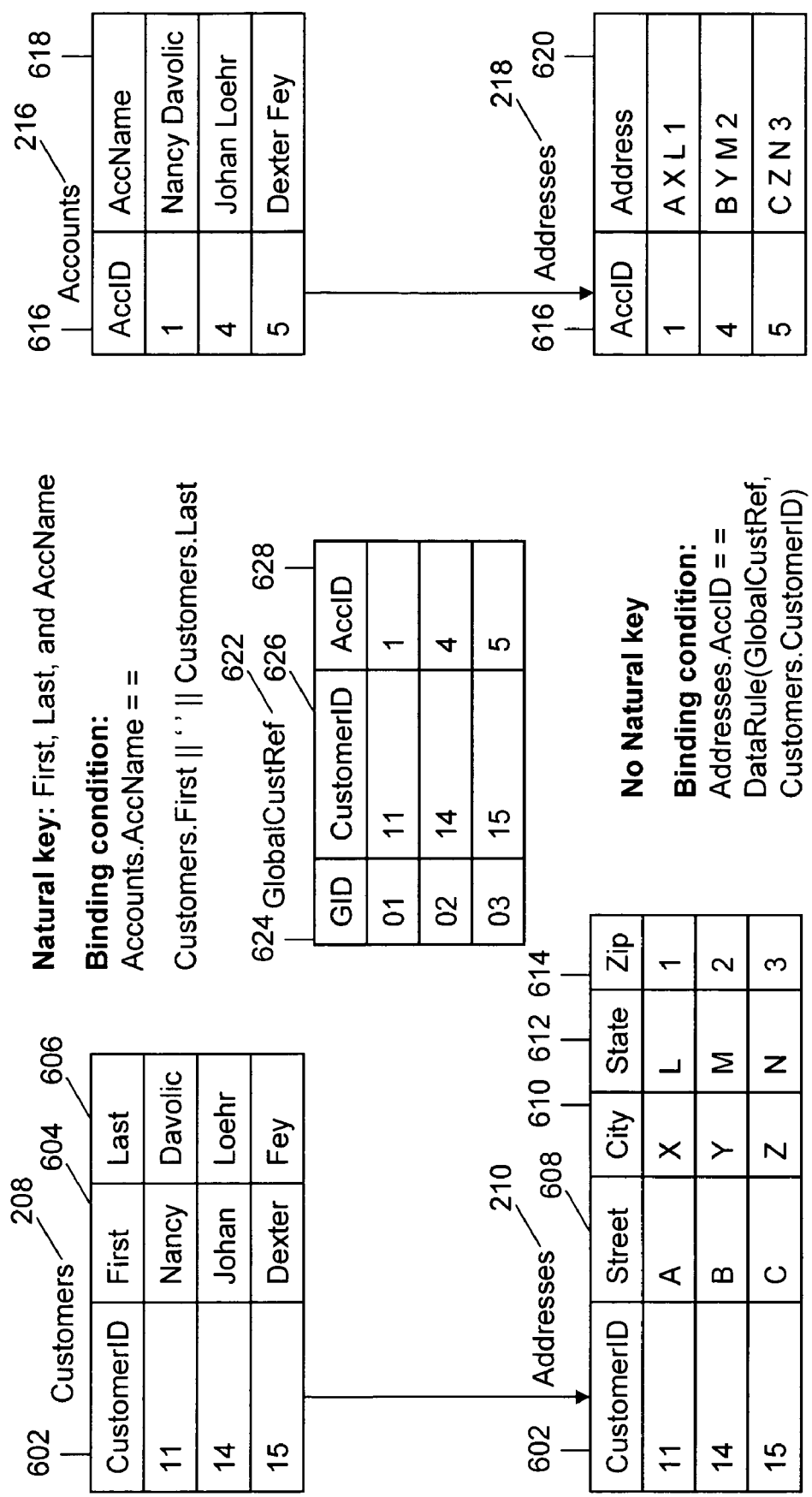
FIG. 6 illustrates the generation of an exemplary GDO, in accordance with an embodiment of the invention.

FIG. 6 illustrates the generation of an exemplary GDO, in accordance with an embodiment of the invention. Data mapper 106 determines the binding conditions between the LDOs, CustomerLDO 302 and AccountsLDO 306. Consider, for example, that the LDO attributes in CustomerLDO 302 are CustomerID 602, First 604, Last 606, Street 608, City 610, State 612, and Zip 614. The LDO attributes in AccountsLDO 306 are AccID 616, AccName 618, and Address 620. The GDO attributes in CustomerGDO are GID, Name, and Address. The binding conditions are used to identify the same customers referred by First 604 and Last 606 in CustomerLDO 302, AccName 618 in AccountsLDO 306, and Name in CustomerGDO. The binding conditions are used to ascertain that a customer in CustomerLDO 302, AccountsLDO 306, and CustomerGDO is the same customer. The binding condition between CustomerLDO 302 and AccountsLDO 306 are determined on the basis of the natural keys, First 604, Last 606 and AccName 618. The binding conditions can be represented as follows:

CustomerGDO.Name==CustomerLDO.First||'*'||CustomerLDO.Last; and

CustomerGDO.Name==AccountsLDO.AccName where, symbol '==' represents equivalence.

Thereafter, the transformation functions are determined, based on the determined binding conditions. The transformation functions can be represented as follows:

CustomerGDO.Name=CustomerLDO.First||'*'||CustomerLDO.Last;

CustomerGDO.Address= CustomerLDO.Street||'*'||CustomerLDO.City||'*'||CustomerLDO.State||'*'|| CustomerLDO.Zip;

CustomerGDO.Name=AccountsLDO.AccName; and

CustomerGDO.Address=AccountsLDO.Address where, symbol '=' represents mapping of the LDO attributes onto the GDO attributes.

Further, data mapper 106 constructs value lookup tables. The value lookup tables contain LDO values along with corresponding GDO values. With reference to FIG. 6, an exemplary value lookup table, GlobalCustRef 622, has been illustrated, where a customer is referred as '11' in the column, CustomerID 626, as '1' in the column, AccID 628, and has been assigned a global key '01' in the column, GID 624, by data mapper 106. If the data in Customer data management system 202 is required to be integrated with the data in Accounts data management system 204, for the customer corresponding to CustomerID 626 '11', the corresponding GID 624 '01' is obtained from GlobalCustRef 622. Thereafter, the corresponding AccID 628 '1' is obtained. Accordingly, Addresses 210 is integrated with Addresses 218. This integration is performed with the help of GlobalCustRef 622 and a data rule, which represents the relationship between the data in Customer data management system 202 and Accounts data management system 204. With reference to FIG. 6, the data rule implies that for a customer corresponding to CustomerLDO.CustomerID, the corresponding AccountsLDO.AccID can be identified by applying the data rule on GlobalCustRef 622.

In accordance with an embodiment of the invention, the value lookup tables are included in the GDO and are stored in a data repository, which is a central data storage unit. In accordance with another embodiment of the invention, the value lookup tables are stored in an external system and are referenced by the GDO.

FIG. 7 illustrates an exemplary representation of the GDO, in accordance with an embodiment of the invention. With reference to FIG. 7, CustomerGDO 700 includes two data tables, Customers 702 and Addresses 704. The illustration of CustomerGDO 700 shows the data-table relationships between Customers 702 and Addresses 704. Further, the mappings between CustomerGDO 700, CustomerLDO 302 and AccountsLDO 306 are also included in CustomerGDO 700. In accordance with an embodiment of the invention, the mappings are stored and maintained in a metadata repository, which is a central data storage unit. The mappings are determined on the basis of the binding conditions between CustomerGDO 700 and the LDOs, CustomerLDO 302 and AccountsLDO 306, and the transformation functions between their attributes.

Further, a first transformation function for transforming a GDO attribute to an LDO attribute can be obtained from a second transformation function. The second transformation function is an existing transformation function, determined at step 504, which transforms the LDO attribute to the GDO attribute.

Figure 8:
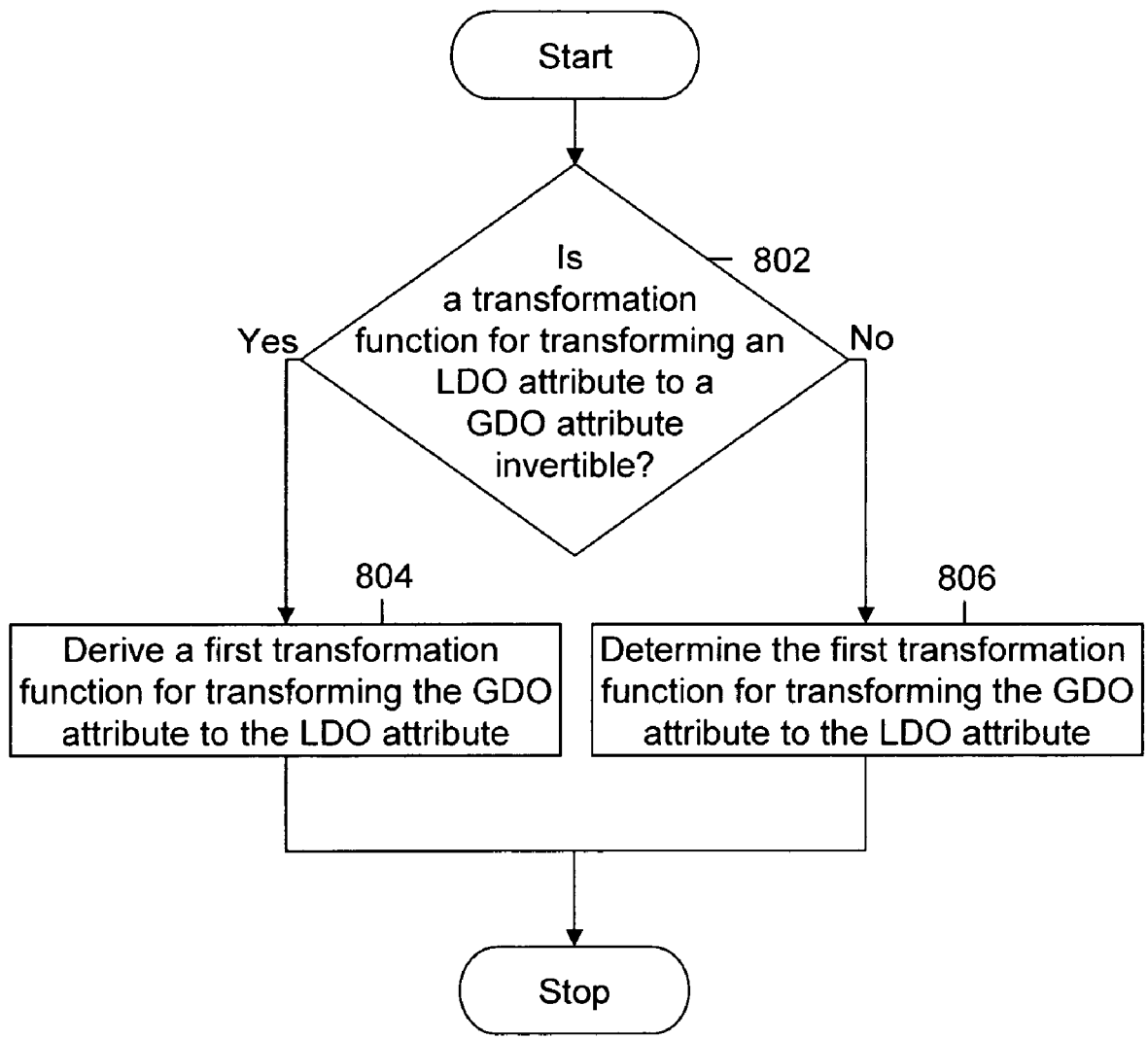
FIG. 8 is a flow diagram, illustrating a method for obtaining a transformation function for transforming a GDO attribute to an LDO attribute, in accordance with an embodiment of the invention.

FIG. 8 is a flow diagram, illustrating a method for obtaining a transformation function for transforming the GDO attribute to the LDO attribute, in accordance with an embodiment of the invention. At step 802, data mapper 106 checks if the second transformation function is invertible. The second transformation function is invertible when it is a symmetric transformation function. If it is found that the second transformation function is invertible, step 804 is performed. At step 804, data mapper 106 derives the first transformation function from the invertible second transformation function. The first transformation function is obtained by reversing the invertible second transformation function. For example, if the invertible second transformation function is as follows:

CustomerGDO.Name=AccountsLDO.AccName, the first transformation function is derived as follows:

AccountsLDO.AccName=CustomerGDO.Name.

If, at step 802, it is found that the second transformation function is not invertible, then step 806 is performed. At step 806, the first transformation function is determined on the basis of binding conditions corresponding to the non-invertible second transformation function. As the non-invertible second transformation function is asymmetric, the first transformation function cannot be obtained just by reversing the non-invertible second transformation function. Data mapper 106 determines the first transformation function as explained in the following example. If the non-invertible second transformation function is as follows:

CustomerGDO.Name=CustomerLDO.First||'*'||CustomerLDO.Last, the first transformation function is determined as follows:

CustomerLDO.First=token(CustomerGDO.Name, 1).

In the non-invertible second transformation function, the GDO attribute, Name 706, of CustomerGDO 700 is obtained by concatenating the LDO attribute, First 604, with the LDO attribute, Last 606, of CustomerLDO 302. Therefore, in the first transformation function, First 604 of CustomerLDO 302 is determined by selecting the first token of Name 706 of CustomerGDO 700.

In accordance with an embodiment of the invention, data mapper 106 allows the user to select attributes for generating new transformation functions. The user can select a source system, a target system, GDO attributes and an interface type. Examples of the interface type include, but are not limited to, Structured Query Language (SQL), extensible Stylesheet Language Transformation (XSLT), Enterprise Application Integration (EAI) tools such as Tibco, and Extract, Transform, Load (ETL) tools such as Informatica. Thereafter, data mapper 106 expresses the transformation function for each selected GDO attribute in a language or metadata interchange format of the selected interface type. For the source system, the new transformation function corresponds to the transformation function that transforms an LDO attribute to a GDO attribute. For the target system, the new transformation function corresponds to the transformation function that transforms the GDO attribute to another LDO attribute.

The mappings of the LDO attributes and the GDO attributes can be affected by changes in schemas of data sources 104. Schemas are used to define data stored in the data tables of data sources 104. For example, details of CustomerID 602, First 604 and Last 606, of Customers 208 are included in the schema of Customers 208. The changes in the schemas of data sources 104 affect the data-table relationships. For example, a change in the name of the column, CustomerID 602, will affect data-table relationships stored in CustomerLDO 302. Therefore, schemas of the LDOs are also affected by the schema changes of data sources 104. Once the schemas of the LDOs are updated, the mappings onto the GDO are also required to be updated.

Figure 9:
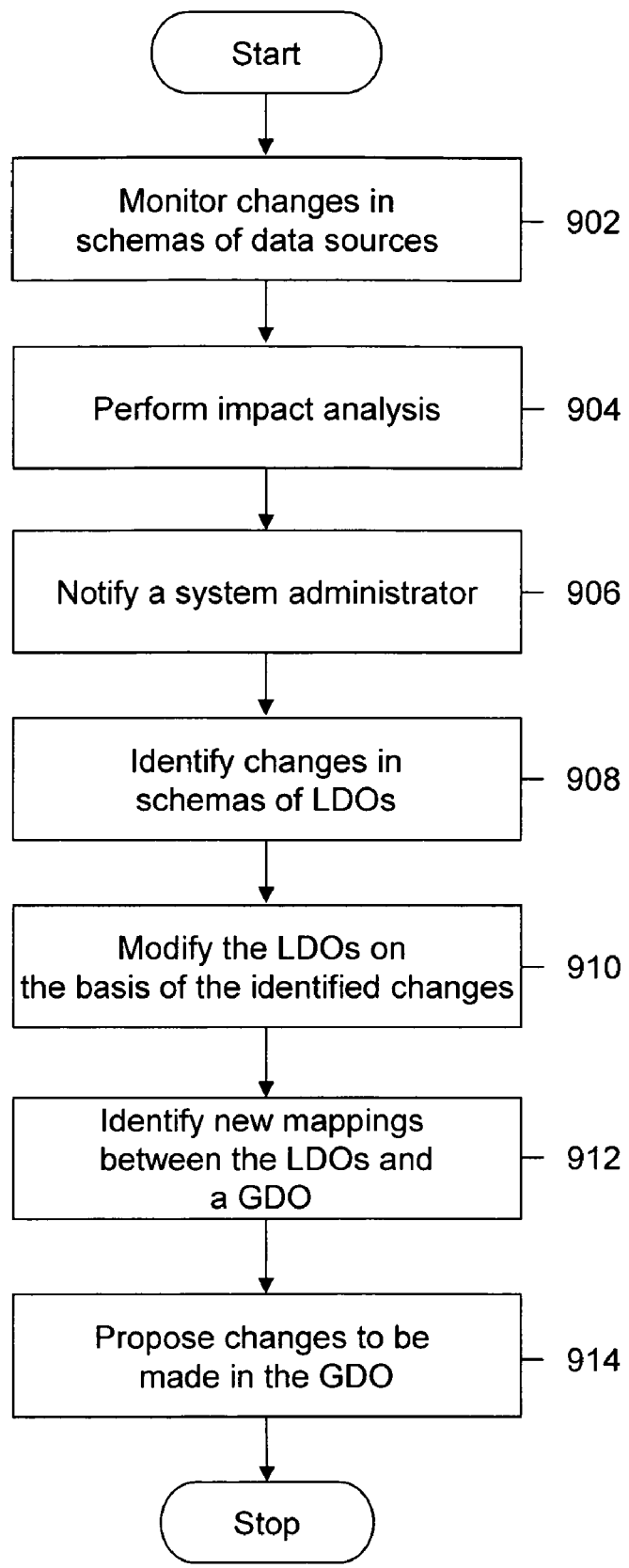
FIG. 9 is a flow diagram, illustrating a method for updating schema of the GDO, in accordance with an embodiment of the invention.

FIG. 9 is a flow diagram, illustrating a method for updating schema of the GDO, in accordance with an embodiment of the invention. At step 902, the changes in the schemas of data sources 104 are monitored. The schema changes in data sources 104 are monitored by comparing the current metadata of data sources 104 with metadata stored in the metadata repository. Metadata from the plurality of LDOs and the GDO is stored and maintained in the metadata repository. In accordance with an embodiment of the invention, the metadata repository also stores and maintains the metadata from data sources 104. At step 904, impact analysis is performed on the basis of the schema changes of data sources 104 identified at step 902. The impact analysis determines the scope and impact of the identified schema changes of data sources 104. The impact analysis identifies changes required in one or more LDOs from the plurality of LDOs to reflect the schema changes and the changes required in the mappings between the affected LDOs and the GDO. In addition, the impact analysis identifies affected interfaces for each existing data-integration project. Details of the impact analysis have been provided in conjunction with FIGS. 11a and 11b. Next, at step 906, data mapper 106 notifies a system administrator of enterprise 100 about the changes identified by the impact analysis. In an embodiment of the invention, data mapper 106 notifies a data analyst of enterprise 100.

Thereafter, at step 908, data mapper 106 identifies changes required in the schemas of the LDOs on the basis of the impact analysis and proposes the changes to the system administrator. While reviewing the proposed changes, the system administrator may modify the proposed changes, if required, and then approve them. Thereafter, at step 910, data mapper 106 modifies the schemas of the LDOs to reflect the identified schema changes of the LDOs.

Further, at step 912, new mappings between the modified LDOs and the GDOs are identified. In an embodiment of the invention, the new mappings between the modified LDOs and the GDOs are automatically identified by data mapper 106. In another embodiment of the invention, the new mappings between the modified LDOs and the GDOs are identified manually.

At step 914, data mapper 106 proposes changes to be made in the GDOs to the system administrator. The proposed changes of the GDOs reflect the schema changes of the LDOs, thereby reflecting the schema changes of data sources 104. In an embodiment of the invention, the changes to be made in the GDOs are proposed automatically.

In an embodiment of the invention, the schema changes of data sources 104 are monitored with the help of 'schemabots'. The schemabots are software applications that automatically gather information related to the schemas of data sources 104. The schemabots provide the gathered information to a server, which conducts the impact analysis. The server is hereinafter referred to as a mapping server. Details of the schemabots and the mapping server have been provided in conjunction with FIG. 10.

Figure 10:
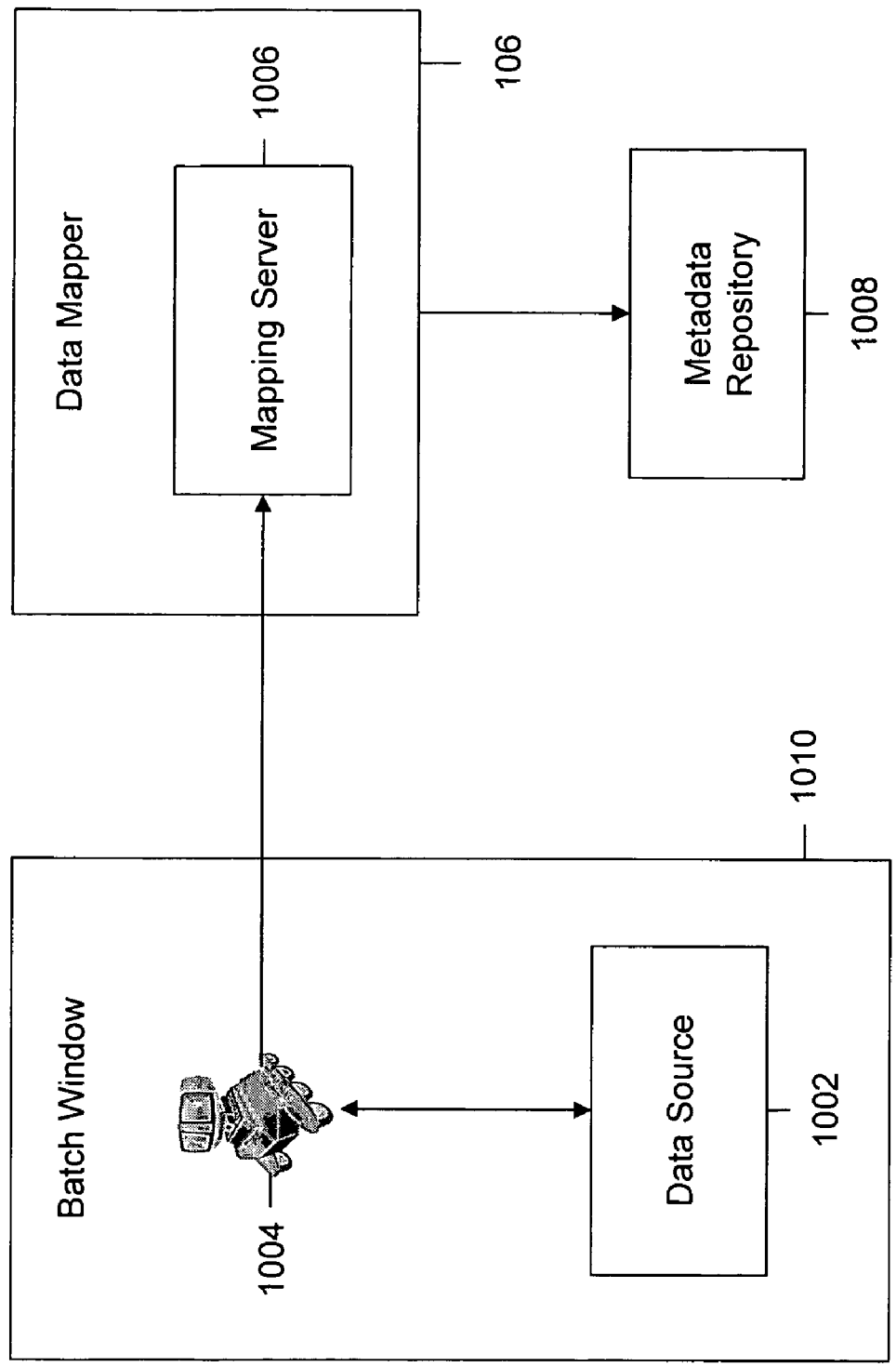
FIG. 10 illustrates how schemabots function with a mapping server to update the schema of the GDO, in accordance with an embodiment of the invention.

FIG. 10 illustrates how schemabots function with the mapping server to update the schema of the GDO, in accordance with an embodiment of the invention. For a data source 1002, a schemabot 1004 monitors the schema changes in data source 1002. Thereafter, schemabot 1004 sends information about the schema changes to a mapping server 1006 included in data mapper 106. Subsequently, mapping server 1006 performs the impact analysis. Based on the impact analysis performed, data mapper 106 updates the mappings stored in a metadata repository 1008.

In accordance with an embodiment of the invention, schemabot 1004 and mapping server 1006 function asynchronously. Schemabot 1004 monitors the schema changes of data source 1002 even when schemabot 1004 is not connected to mapping server 1006. After the schema changes of data source 1002 are identified, schemabot 1004 contacts mapping server 1006 and sends the information about the schema changes, whereby mapping server 1006 performs the impact analysis.

The asynchronous functioning of schemabot 1004 reduces the batch window time for monitoring the schema changes. This batch window time is the period of time available for the batch processing operation of monitoring the schema changes in batch window 1010. Due to its asynchronous functioning, schemabot 1004 is not required to be connected to mapping server 1006 during the monitoring stage. Schemabot 1004 needs to access mapping server 1006 only for sending the information regarding the schema changes. Therefore, the schemabots are able to monitor data sources 104, regardless of their connectivity with mapping server 1006.

Consider, for example that schemabot 1004 monitors data source 1002 for schema changes. Schemabot 1004 is able to monitor data source 1002 in 10 minutes. Mapping server 1006 is able to perform the impact analysis and reconcile the schema changes in one minute. Therefore, the complete process will take 11 minutes. If the functioning of schemabot 1004 is synchronous, the process will take 11 minutes or more if mapping server 1006 is busy or stalled. Schemabot 1004 does not require the connectivity to mapping server 1006 for monitoring data source 1002. Therefore, the process of monitoring and performing impact analysis can be separated. Subsequently, the batch window time requirement will be reduced to 10 minutes. Schemabot 1004 will then send the information about the schema changes to mapping server 1006, once its connectivity with mapping server 1006 is restored. In this way, the schemabots monitor the schema changes of data sources 104. These schema changes affect the mappings of the LDO onto the GDO.

FIGS. 11a and 11b illustrate an exemplary representation of the impact analysis, in accordance with an embodiment of the invention. With reference to FIG. 7, a previous case of mapping between CustomerLDO 302 and CustomerGDO 700 has been considered. When the columns, First 604 and Last 606, of Customers 208 are changed to new columns, FirstName 1102 and LastName 1104, schemabots send information about the schema changes in Customers 208 to mapping server 1006. Thereafter, mapping server 1006 performs an impact analysis, based on the schema changes in Customers 208. Based on this impact analysis, data mapper 106 identifies changes required in the binding conditions and the transformation functions between CustomerLDO 302 and CustomerGDO 700 as illustrated in FIG. 11a. These binding conditions and transformation functions are required to be changed in metadata repository 1008. On the basis of these changes, an impact on the interfaces derived from CustomerGDO 700 is determined.

With reference to FIG. 6, a previous case of mappings between the data tables, Customers 208 and Accounts 216, from different data management systems has been considered. When the columns, First 604 and Last 606, of Customers 208 are changed to the new columns, and CustomerLDO 302 and CustomerGDO 700 are updated, data mapper 106 identifies changes required in the binding conditions and the transformation functions between CustomerLDO 302 and AccountsLDO 306 as illustrated in FIG. 11b.

Further, the mappings can be affected by changes in data of data sources 104. The data changes of data sources 104 are monitored and the identified data changes are reconciled by updating the value lookup tables.

Figure 12:
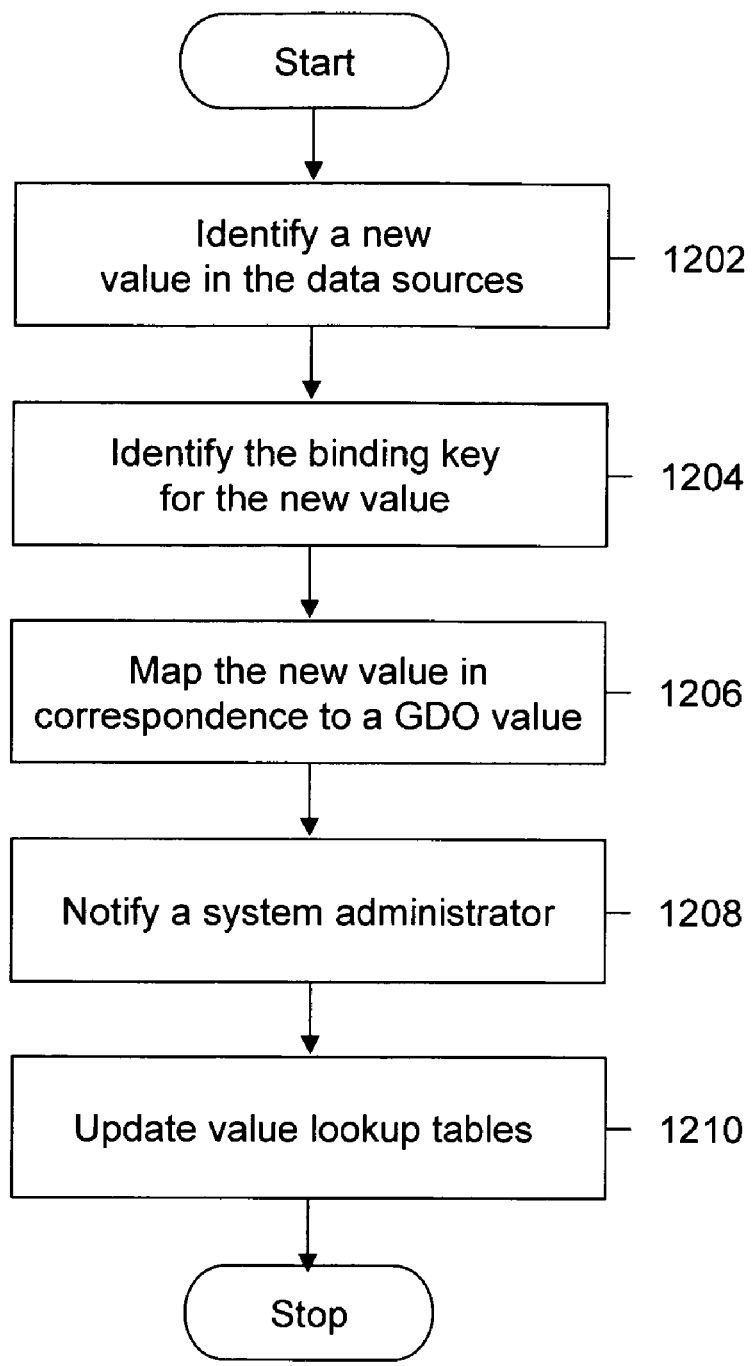
FIG. 12 is a flow diagram, illustrating a method for updating data changes in value lookup tables, in accordance with an embodiment of the invention.

FIG. 12 is a flow diagram, illustrating a method for updating the data changes in value lookup tables, in accordance with an embodiment of the invention. At step 1202, a new value in a data source from data sources 104 is identified. The new value is the value that is present in the data source, but is not present in the value lookup tables. Thereafter, at step 1204, a binding key is identified for the identified new value. At step 1206, the identified new value is mapped onto the value lookup tables, in correspondence to a GDO value. The corresponding GDO value is identified on the basis of the identified binding key. In an embodiment of the invention, a global key is present in the value lookup tables for the identified binding key. Therefore, the new value can be mapped onto the value lookup tables in correspondence to the existing global key. In another embodiment of the invention, when the global key is not present in the value lookup tables for the identified binding key, the global key is generated. Subsequently, the new value is mapped onto the value lookup tables in correspondence to the generated global key.

Steps 1202 to 1206 are performed for every new value in data sources 104. Thereafter, at step 1208, data mapper 106 notifies the system administrator about the identified data changes. In an embodiment of the invention, data mapper 106 notifies the data analyst about the identified data changes. Next, at step 1210, the value lookup tables are updated on the basis of the identified new values.

Figure 13:
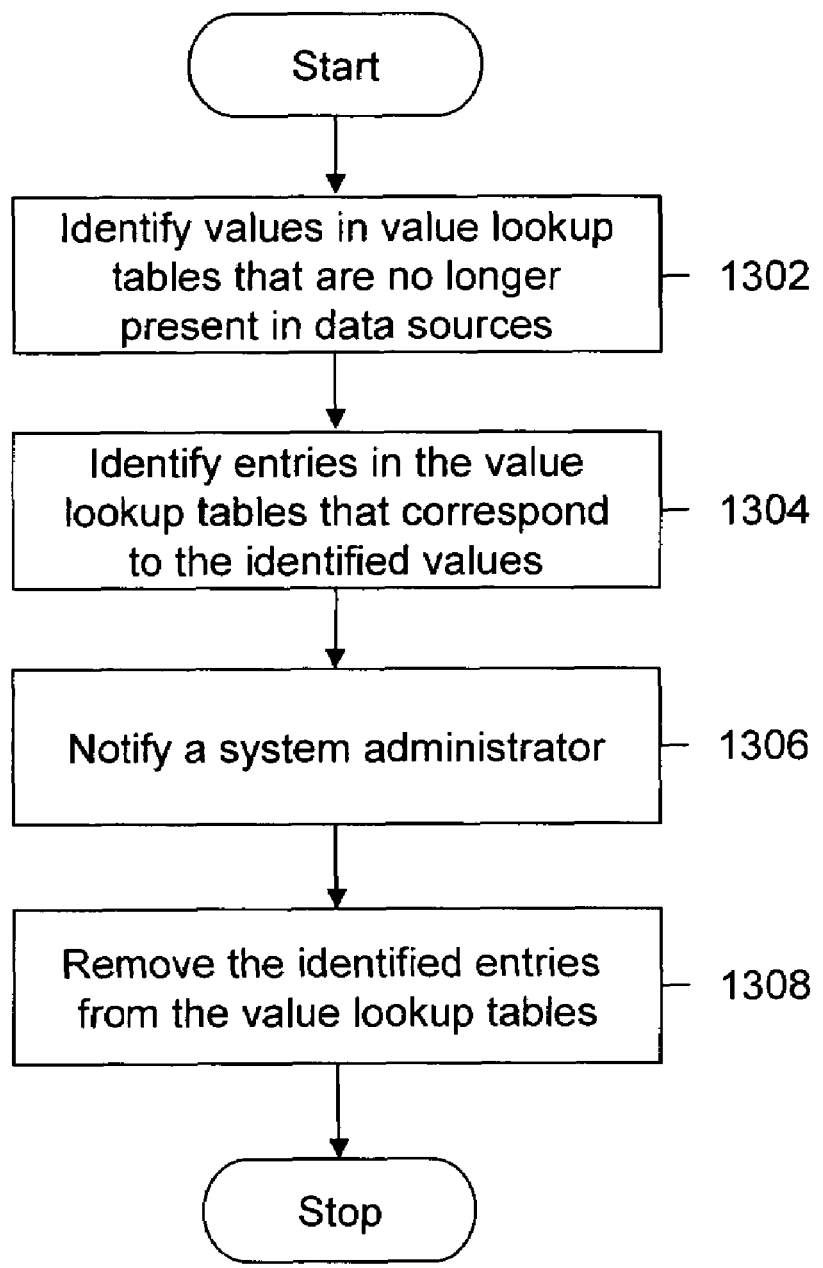
FIG. 13 is a flow diagram, illustrating a method for removing an entry from the value lookup tables, in accordance with an embodiment of the invention.

Further, there can be some values that have been removed from data sources 104. These missing values need to be removed from the value lookup tables. FIG. 13 is a flow diagram, illustrating a method for removing entries corresponding to the missing values from the value lookup tables, in accordance with an embodiment of the invention. At step 1302, values in the value lookup tables that are no longer present in data sources 104 are identified. Thereafter, at step 1304, entries in the value lookup tables that correspond to the identified values are identified. At step 1306, data mapper 106 notifies the system administrator about the identified data changes. In an embodiment of the invention, data mapper 106 notifies the data analyst about the identified data changes. At step 1308, the identified entries are removed from the value lookup tables.

In an embodiment of the invention, mapping server 1006 reconciles the data changes.

In an embodiment of the invention, the data changes in data sources 104 are monitored by 'databots' on the basis of which the databots identify the data changes.

The databots are software applications that automatically gather information related to the data in data sources 104. The databots employ various Change Data Capture (CDC) methods to identify the data changes. Examples of the CDC methods include, but are not limited to, the use of timestamps, change logs, delta tables, custom CDC mechanism, and full compare.

Data management systems 102 can timestamp the data changes. In this case, databots check the data changes that have been timestamped after the last time when the data changes were monitored.

Data management systems 102 can maintain the change logs that include information about the data changes. A change log can be maintained as an audit log or a transaction log.

Data management systems 102 can maintain delta tables that include the changes since the last time.

Databots can employ the custom CDC mechanism. The custom CDC mechanism uses an adapter to extract the data changes in data sources 104. An adapter is a specialized application or software system that is used to monitor data changes in a data management system. The adapter extracts data changes in the data management system and supplies the extracted data changes to a databot using proprietary interfaces and logic specific to that data management system. For example, SAP R/3 application can publish changes using Intermediate Documents (IDOCs). IDOC is a proprietary SAP R/3 document format implemented using the Application Link Enabling (ALE) interface. A custom adapter may be written to read generated IDOCs, translate them to a standard interface understood by the databot such as an eXtensible Markup Language (XML) based schema, and publish the information based on the IDOCs to the databot using the standard interface.

Databots can perform the full compare of the data from data sources 104 and the data cached in the data repository.

In accordance with an embodiment of the invention, the databots and mapping server 1006 function asynchronously. The databots monitor the data changes in data sources 104, even when the databots are not connected to mapping server 1006 that reconciles the data changes in the value lookup tables. On identifying the data changes, the databots contact mapping server 1006 and upload the information about the data changes. Thereafter, mapping server 1006 reconciles the data changes as explained in FIGS. 12 and 13.

Figure 14:
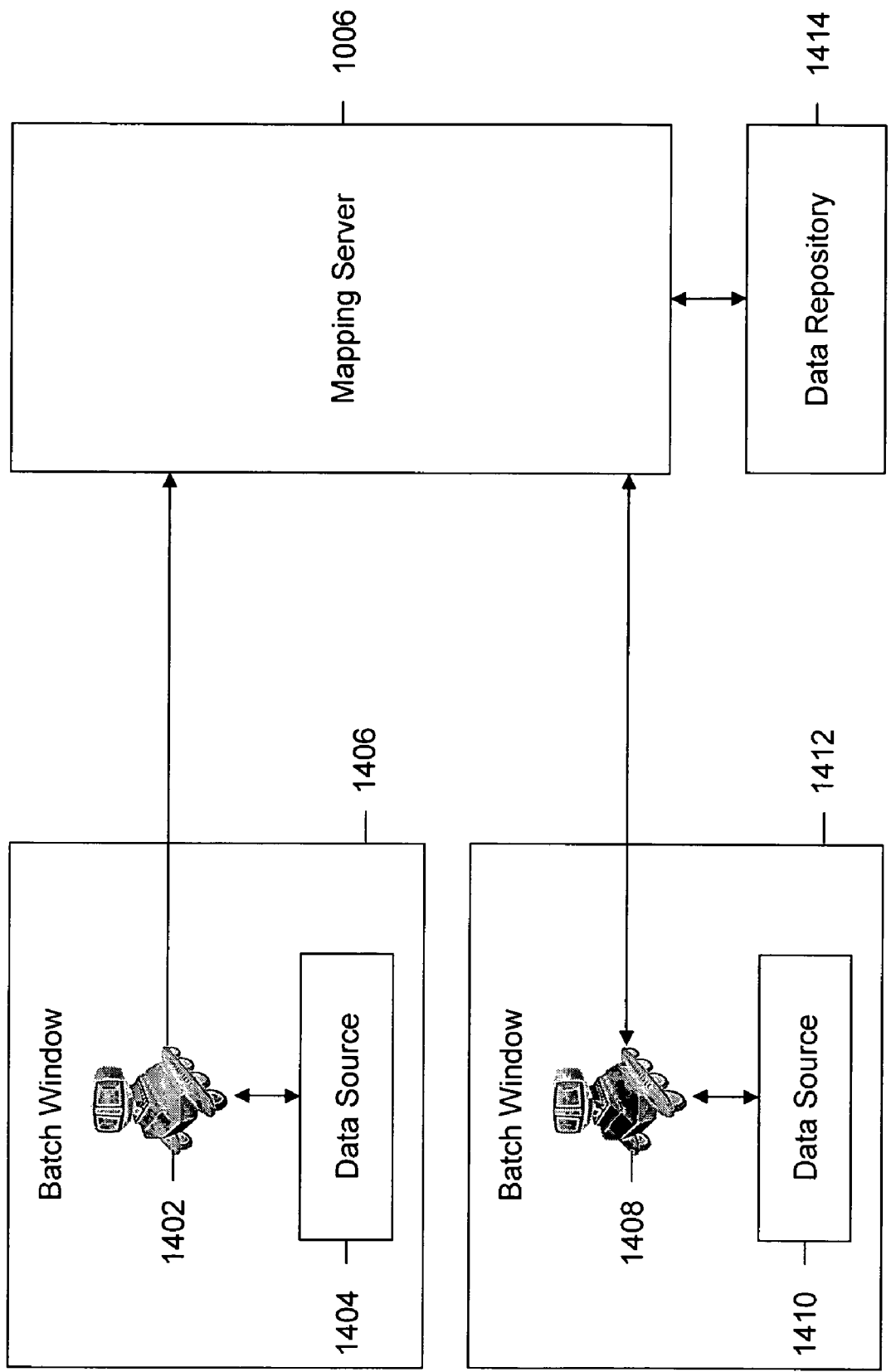
FIG. 14 illustrates how databots function with the mapping server to update the data changes in the value lookup tables, in accordance with an embodiment of the invention.

FIG. 14 illustrates how databots function with mapping server 1006 to update the data changes in the value lookup tables, in accordance with an embodiment of the invention. Databots 1402 and 1408 monitor data changes in data sources 1404 and 1410, in batch windows 1406 and 1412, respectively. When data changes in data source 1404 are identified, databot 1402 sends information about the data changes to mapping server 1006. Subsequently, mapping server 1006 contacts databot 1408, which then gathers information about the corresponding data in which the data changes were identified. Thereafter, databot 1408 sends the gathered information to mapping server 1006. Subsequently, mapping server 1006 reconciles the data changes with value lookup tables stored in a data repository 1414.

For example, databot 1402 identifies a new customer ABC and its identifying key 123, and contacts mapping server 1006. On receiving the new customer name, mapping server 1006 contacts databot 1408, for keys representing the same customer. If the same customer is present in data source 1410 and its identifying key is 567, mapping server 1006 updates the value lookup table as follows:

| Global key | Data Source 1404 key | Data Source 1410 key |
|---|---|---|
| 331122 | 123 | 567 |

The asynchronous functioning of the databots reduces the batch window time requirement for monitoring data changes. The databots access mapping server 1006 only to send the information about the identified data changes. These data changes affect the mappings of the LDO onto the GDO.

Further, the mappings can be affected by changes in the logic of applications in data management systems 102. For instance, a change in the logic of an application in a data management system can cause the same column to be used in a different way in that application. If there are mappings between this column and columns in other applications (from other data management systems), these mappings may no longer be applicable to the new usage of that column. Consequently, the mappings between this column and the columns in other applications no longer hold. For example, if there is an internet-sales application that stores the selling price of items in a column, Sales. There is a mapping between Sales and another column, NetSales, in an order-fulfillment system. Initially, no sales tax is charged on the internet sales, therefore, Sales contains only the marked price of the items. The order-fulfillment system contains orders from on-line and in-store sales, and thus has a separate column for the sales tax, SalesTax. However, since there is initially no sales tax on the internet sales, that column is not mapped to the internet-sales application. If now the sales tax needs to be imposed on certain items for the internet sales, Sales will no longer match NetSales for orders related to these items. Such changes can be identified by analyzing the statistical data of the existing binding conditions and the existing transformation functions. Details of updating the logic of the mappings have been provided in conjunction with FIGS. 15 and 16.

Figure 15:
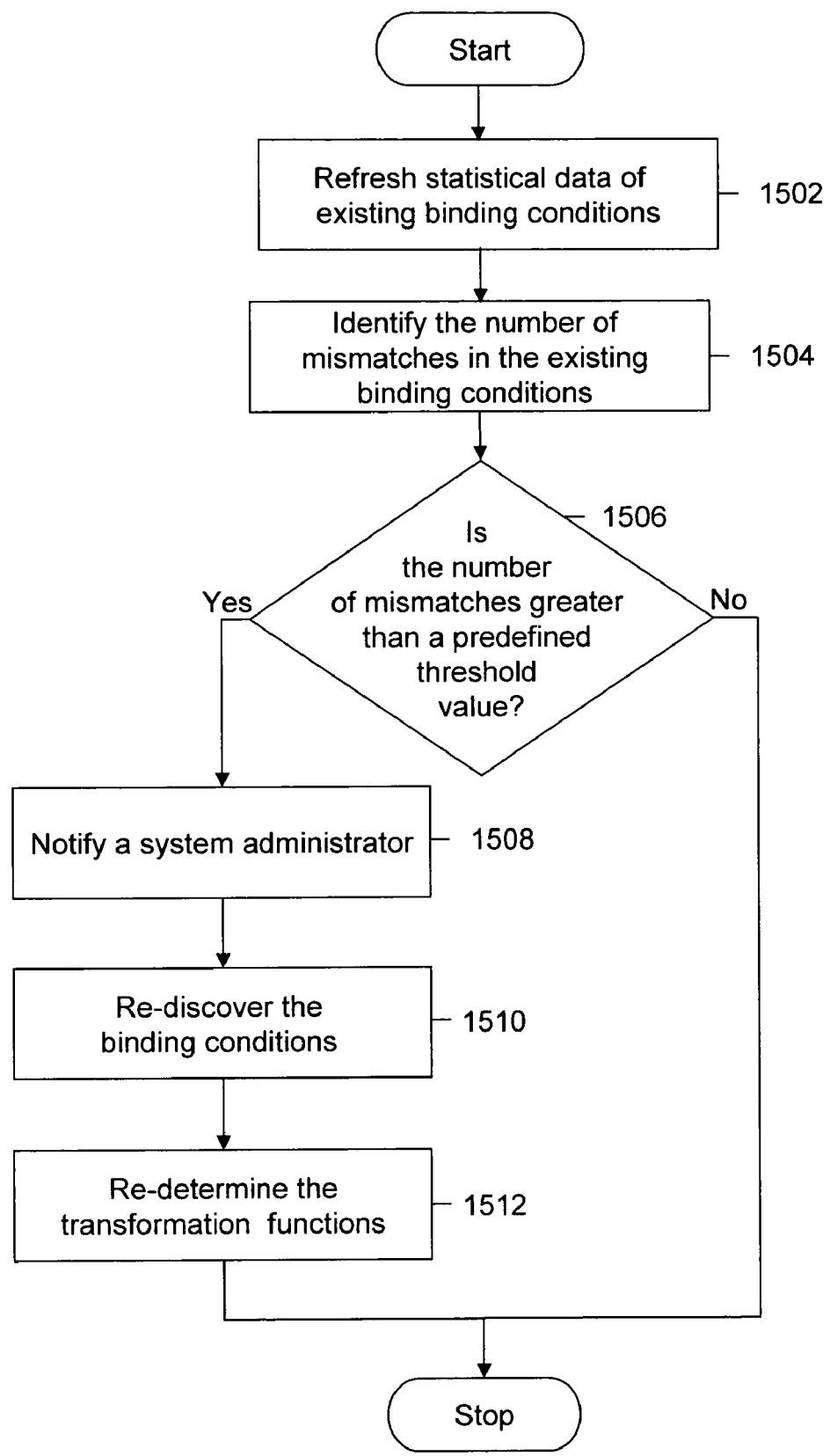
FIG. 15 is a flow diagram, illustrating a method for updating the logic of data mappings, on the basis of refreshed statistical data of existing binding conditions, in accordance with an embodiment of the invention.

FIG. 15 is a flow diagram, illustrating a method for updating the logic of data mappings, on the basis of refreshed statistical data of the existing binding conditions, in accordance with an embodiment of the invention. At step 1502, data mapper 106 refreshes the statistical data of the existing binding conditions.

The statistical data of the existing binding conditions are defined by hit rate and selectivity. The statistical data also varies for a source and a target. The source can be an LDO from the plurality of LDOs, the target can be an LDO from the plurality of LDOs or the GDO. In accordance with an embodiment of the invention, a control set of rows is created for the GDO by using mappings between the plurality of LDOs.

Consider, for example, the source is CustomerLDO 302 and the target is CustomerGDO 700. A source hit rate of 78% denotes that 78% of CustomerLDO 302 instances or rows in Customers 208 and Addresses 210 match an instance or row of CustomerGDO 700. Therefore, 78% of customers referred by First 604 and Last 606 in CustomerLDO 302 match Name 706 of CustomerGDO 700 in one or more instances. Similarly, a target hit rate of 5% denotes that 5% of CustomerGDO 700 instances have a corresponding CustomerLDO 302 instance, wherever a binding condition is true. Therefore, 5% of customers referred to by Name 706 in CustomerGDO 700 match First 604 concatenated with Last 606 of CustomerLDO 302 in one or more instances.

A source selectivity of 82% denotes that the number of unique values for binding condition source expressions divided by the total number of rows in the source is 0.82. Consider, for example, that the binding condition between the source and the target is:

SourceCol1+SourceCol2==TargetColA; and
SourceCol3==TargetColB−TargetColC.

Source selectivity is calculated as:

Number of unique values for (SourceCol1+Source-Col2,SourceCol3)/number of rows.

If there are 3 rows, where

| Row No. | SourceCol1 | SourceCol2 | SourceCol3 | Binding Condition Tuples (SourceCol1 + SourceCol2, SourceCol3) |
|---|---|---|---|---|
| 1 | 1 | 1 | 1 | {2, 1} |
| 2 | 0 | 2 | 1 | {2, 1} |
| 3 | 1 | 2 | 2 | {3, 2} |

The number of unique values of (SourceCol1+SourceCol2, SourceCol3) is 2, {2, 1} and {3, 2}, and the selectivity is ⅔=0.67 or 67%.

Target selectivity can be calculated for the target expressions in a similar way.

Source hit rate, target hit rate, source selectivity, and target selectivity are considered as the statistical data of the existing binding conditions. A change in any of these indicates a change in logic.

In an embodiment of the invention, data mapper 106 automatically refreshes the statistical data of the existing binding conditions. In another embodiment of the invention, data mapper 106 refreshes the statistical data of the existing binding conditions on demand. Thereafter, at step 1504, data mapper 106 identifies the number of mismatches in the existing binding conditions. Mismatches in binding conditions pertain to rows in the source that do not have corresponding values in the target. Considering the previous example, the mismatches include all the customers in CustomerLDO 302 that have a customer name defined by First 604 concatenated with Last 606 that does not match Name 706 for any instance of CustomerGDO 700. The number of mismatches is related to the hit rate as follows:

miss rate=1−hit rate, and

Number of miss matches=miss rate*number of rows.

Therefore, if the source hit rate is 0.72, then the source miss rate is (1−0.72) or 0.28.

At step 1506, data mapper 106 checks if the number of mismatches is greater than a predefined binding-condition threshold value. The predefined binding-condition threshold value is a variable that can be system-defined or user-defined. In accordance with another embodiment of the invention, data mapper 106 identifies changes in the statistical data, and compares it with a corresponding predefined threshold value.

If it is found that the number of mismatches is greater than the predefined binding-condition threshold value, step 1508 is performed. At step 1508, data mapper 106 notifies the system administrator. In an embodiment of the invention, data mapper 106 notifies the data analyst. Next, at step 1510, the binding conditions are re-discovered. At step 1512, the transformation functions are re-determined on the basis of the re-discovered binding conditions. In accordance with an embodiment of the invention, steps 1510 and 1512 are performed by data mapper 106. In accordance with another embodiment of the invention, steps 1510 and 1512 are performed by partial manual intervention.

In accordance with an embodiment of the invention, LDO attributes, whose binding conditions have been re-discovered, are re-mapped. The re-mapping of the LDO attributes onto the corresponding GDO attributes is performed on the basis of the re-determined transformation functions.

Figure 16:
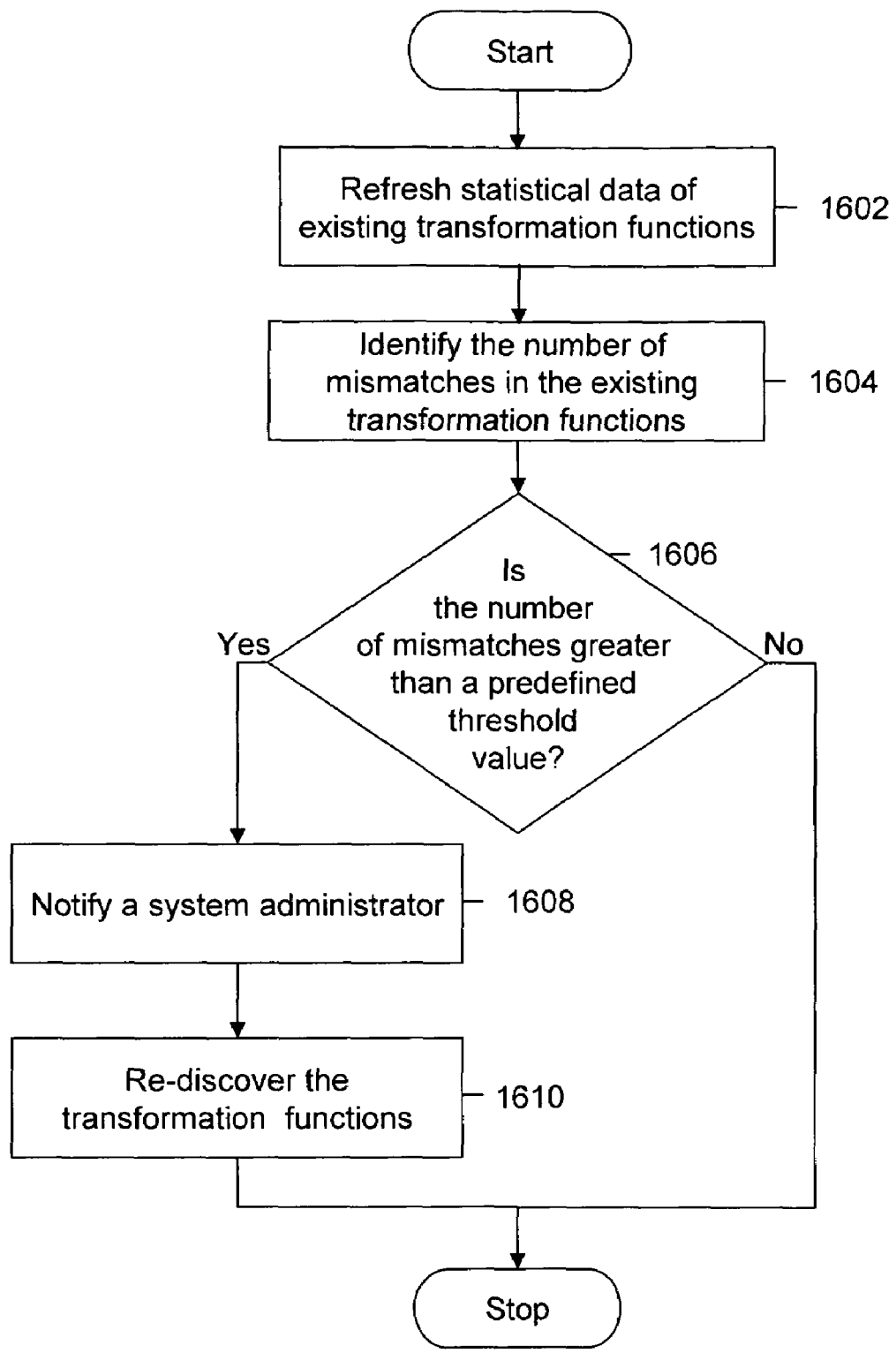
FIG. 16 is a flow diagram, illustrating a method for updating the logic of the data mappings, on the basis of refreshed statistical data of existing transformation functions, in accordance with an embodiment of the invention.

FIG. 16 is a flow diagram, illustrating a method for updating the logic of the data mappings on the basis of refreshed statistical data of the existing transformation functions, in accordance with an embodiment of the invention. For a binding condition between a source and a target, and a transformation function between a source attribute and a target attribute, statistics for the source attribute hit rate can be obtained. The source attribute hit rate is obtained by counting the percentage of target rows, where the transformation is true. Considering the previous example, the source is CustomerLDO 302 and the target is CustomerGDO 700. The binding condition between CustomerLDO 302 and CustomerGDO 700 is:

CustomerGDO.Name==CustomerLDO.First||' '||CustomerLDO.Last

Therefore, the LDO attributes, Street 608, City 610, State 612, and Zip 614, map onto the GDO attribute, Address, by the following transformation function:

CustomerGDO.Address=
 CustomerLDO.Street||' '||CustomerLDO.City||' '||CustomerLDO.State||' '||CustomerLDO.Zip The hit rate for this transformation is the percentage of rows in CustomerGDO 700, where Address matches CustomerLDO.Street||' '||CustomerLDO.City||' '||CustomerLDO.State||' '||CustomerLDO.Zip for CustomerLDO 302 instances, and binding condition CustomerGDO.Name==CustomerLDO.First||' '||CustomerLDO.Last is true. The binding condition binds the rows. If out of 1000 bound rows:

CustomerGDO.Address=
 CustomerLDO.Street||' '||CustomerLDO.City||' '||CustomerLDO.State||' '||CustomerLDO.Zip is true for 850 rows, the hit rate is 850/1000=0.85. Therefore, the miss rate is 0.15.

At step 1602, data mapper 106 refreshes the statistical data of the existing transformation functions. In an embodiment of the invention, data mapper 106 automatically refreshes the statistical data of the existing transformation functions. In an embodiment of the invention, data mapper 106 refreshes the statistical data of the existing transformation functions on demand. Thereafter, at step 1604, data mapper 106 identifies the number of mismatches in the existing transformation functions. At step 1606, data mapper 106 checks if the number of mismatches is greater than a predefined transformation-function threshold value. The predefined transformation-function threshold value is a variable that can be system-defined or user-defined.

In accordance with another embodiment of the invention, data mapper 106 identifies changes in the statistical data, and compares it with a corresponding predefined threshold value. Continuing from the previous example, let us consider that the predefined threshold value for identifying the logic changes is 10% or 0.1. When a databot detects a new miss rate of 0.3, the change in the miss rate is calculated as:

0.3−0.15=0.15

The change in the miss rate is greater than the predefined threshold value of 0.1.

If it is found that the number of mismatches is greater than the predefined transformation-function threshold value, step 1608 is performed. At step 1608, data mapper 106 notifies the system administrator about a potential logic change. In an embodiment of the invention, data mapper 106 notifies the data analyst about the potential logic change. Next, at step 1610, the transformation functions are re-discovered. In accordance with an embodiment of the invention, data mapper 106 performs step 1610. In accordance with another embodiment of the invention, step 1610 is performed by partial manual intervention.

In accordance with an embodiment of the invention, LDO attributes, whose transformation functions have been re-discovered, are re-mapped. The re-mapping of the LDO attributes onto the corresponding GDO attributes is performed on the basis of the re-discovered transformation functions.

In accordance with an embodiment of the invention, the mappings of the LDOs onto the GDO are updated at a predefined time interval. The predefined time interval is a variable that can be system-defined or user-defined. In accordance with another embodiment of the invention, the mapping can be updated on demand.

An embodiment of the invention automates the process of data mapping in data-integration projects. The process of data mapping involves the determination of the inter-relations between the data across data management systems 102. This makes data of a data management system from data management systems 102 available to other data management systems from data management systems 102.

A GDO consolidates corresponding LDOs into a single integrated model. Therefore, a user can refer to the GDO for information about any data. The GDO includes the transformation functions that transform the LDO attributes to the GDO attributes. An embodiment of the invention provides a method for obtaining the transformation functions for transforming the GDO attributes to the LDO attributes.

An embodiment of the invention facilitates data retrieval from data sources 104 included in data management systems 102. When a particular data is required, the GDO corresponding to that particular data is referred to. The GDO provides information about the data source in which the particular data is stored.

According to an embodiment of the invention, the mappings of the LDOs onto the GDO can be updated when the schemas of data sources 104 change. The schema changes can be identified and updated asynchronously. This reduces the batch window time required to monitor the schema changes of data sources 104.

In accordance with an embodiment of the invention, the mappings can be updated when the data in data sources 104 changes. The data changes can be identified and updated in the value lookup tables asynchronously. This reduces the batch window time required to monitor the data changes of data sources 104.

In accordance with an embodiment of the invention, the mappings can be updated when the logic of the mappings changes. The mappings are updated on the basis of the re-determined or re-discovered transformation functions.

In accordance with an embodiment of the invention, data lineage and data flow between data management systems 102 of enterprise 100 can be determined. The data lineage can be traced by using the logical representations of relationships of the LDOs in the GDO. The data lineage identifies how each attribute is generated. The GDO provides the information related to the data flow and lineage by identifying data management systems, from data management systems 102, onto which each attribute maps.

Moreover, the GDO can also be used to generate data movement interfaces. The GDO identifies a source data management system, from data management systems 102, from which an attribute is moved and a target data management system, from data management systems 102, to which the attribute is moved. The GDO also identifies the transformation functions for transforming the attribute from the source data management system to the target data management system. Therefore, the GDO provides the source data management system and rules to identify the source data management system for each attribute. Subsequently, the GDO uses the rules to determine links between data management systems 102. Thereafter, the GDO uses the links to build a graph of data management systems 102, where each source-to-target interface is a directed link from the source data management system to the target data management system.

The GDO can also perform transitive closure analysis on the graph to identify ancestors and descendents for each node. This helps in providing a complete path for any attribute in enterprise 100. This, in turn, helps in providing an impact analysis of a change in any node. The impact analysis identifies nodes that will be affected by a change in a particular node.

Data mapper 106, as described in the invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the acts constituting the method of the invention.

The computer system comprises a computer, an input device, a display unit, the Internet, and a microprocessor. The microprocessor is connected to a communication bus. The computer also comprises a memory, which may include Random Access Memory (RAM) and Read Only Memory (ROM). The computer system also comprises a storage device, which can be a hard disk drive or a removable storage drive such as a floppy disk drive, optical disk drive, and so forth. The storage device can also be other similar means for loading computer programs or other instructions into the computer system.

The computer system executes a set of instructions that are stored in one or more storage elements, in order to process input data. These storage elements may also hold data or other information, as desired, and may also be in the form of an information source or a physical memory element in the processing machine.

The set of instructions may include various commands instructing the processing machine to perform specific tasks such as the acts constituting the method of the invention. The set of instructions may be in the form of a software program, and the software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to user commands, to results of previous processing, or in response to a request made by another processing machine.

While embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for automating a process of data mapping by a data mapper, the data mapping being performed by generating a Global Data Object (GDO) to consolidate a plurality of Local Data Objects (LDOs) into a single integrated data model to facilitate data retrieval from a plurality of data sources, the method comprising:

determining a plurality of binding conditions between each LDO from the plurality of LDOs and the GDO, wherein the plurality of binding conditions are identification relationships between LDOs instances and GDO instances, the GDO is the integrated data model representing relationships between the plurality of LDOs, and each LDO from the plurality of LDOs is a logical representation of relationships between a plurality of tables in a data source of the plurality of data sources;

determining a plurality of transformation functions for transforming a plurality of LDO attributes to at least one of GDO attributes, the plurality of transformation functions being determined based on the determined plurality of binding conditions;

mapping the plurality of LDOs onto the GDO automatically, based on the determined plurality of binding conditions and the determined plurality of transformation functions; and updating the mappings of the plurality of LDOs onto the GDO by monitoring changes in schemas of the plurality of LDOs and the GDO automatically, wherein the data mapper is embodied in the form of a computer system, the computer system including a programmed microprocessor.

2. The method of claim 1 further comprising:

constructing one or more value lookup tables comprising one or more LDO values that correspond to a GDO value; and loading data into the constructed one or more value lookup tables, based on the determined plurality of binding conditions and the determined plurality of transformation functions.

3. The method of claim 1 further comprising deriving a first transformation function for transforming a GDO attribute to an LDO attribute, wherein the first transformation function is automatically derived from a invertible second transformation function, wherein the invertible second transformation function transforms the LDO attribute to the GDO attribute and is one of the plurality of transformation functions.

4. The method of claim 1 further comprising determining a first transformation function for transforming a GDO attribute to an LDO attribute, based on the determined plurality of binding conditions, when the first transformation function corresponds to a non-invertible second transformation function, wherein the non-invertible second transformation function transforms the LDO attribute to the GDO attribute and is one of the plurality of transformation functions.

5. The method of claim 1 further comprising:
   selecting at least one of a source system, a target system, a plurality of GDO attributes, and an interface type; and
   generating new transformation functions, expressed in the selected interface type that correspond to the selected plurality of GDO attributes.

6. The method of claim 1, wherein the mappings are updated periodically.

7. The method of claim 1, wherein the mappings are updated on demand.

8. The method of claim 1, wherein the updating the mappings comprises updating a schema of the GDO, the updating the schema comprising:
   monitoring changes in schemas of the plurality of data sources; and
   notifying a system administrator regarding the schema changes.

9. The method of claim 8, wherein the changes in the schemas are monitored by automatically gathering information using schemabots.

10. The method of claim 9 further comprising:
    monitoring changes in the schemas of the plurality of data sources by analyzing the metadata of the plurality of data sources; and
    performing an impact analysis to determine the scope and impact of the schema changes.

11. The method of claim 10, wherein the schemabots function asynchronously.

12. The method of claim 8 further comprising performing an impact analysis to determine the scope and impact of the schema changes.

13. The method of claim 12 further comprising:
    identifying changes in schemas of the plurality of LDOs, based on the results of the impact analysis;
    modifying the plurality of LDOs, based on the identified schema changes;
    identifying new mappings between the modified plurality of LDOs and the GDO, based on the schema changes of the modified plurality of LDOs; and
    proposing changes to be made in the GDO, based on the identified new mappings.

14. The method of claim 13, wherein the new mappings are identified automatically.

15. The method of claim 13, wherein the new mappings are identified on demand.

16. The method of claim 13, wherein the changes to be made in the GDO are proposed automatically.

17. The method of claim 1, wherein the updating the mappings comprises updating data in one or more value lookup tables comprising one or more LDO values that correspond to a GDO value, the updating the data comprising:
    monitoring changes in data in the plurality of data sources; and
    reconciling the data changes in the one or more value lookup tables, based on the data changes in the plurality of data sources.

18. The method of claim 17, wherein the changes in the data in the plurality of data sources are monitored by automatically gathering information using databots.

19. The method of claim 18 further comprising:
    identifying zero or more new values in the plurality of data sources that are not present in the one or more value lookup tables;
    identifying binding keys for the zero or more new values;
    determining values corresponding to the zero or more new values, based on the identified binding keys; and
    updating the one or more value lookup tables, based on the data changes in the plurality of data sources.

20. The method of claim 19 wherein the databots function asynchronously.

21. The method of claim 17, wherein the monitoring the data changes comprises:
    identifying zero or more new values in the plurality of data sources that are not present in the one or more value lookup tables; and
    identifying zero or more values in the one or more value lookup tables that are no longer present in the plurality of data sources.

22. The method of claim 17, wherein the reconciling the data changes comprises:
    identifying a binding key for a new value identified by databots; and
    mapping the new value in correspondence to the GDO value, based on the identified binding key.

23. The method of claim 17, wherein the reconciling the data changes comprises removing an entry from the one or more value lookup tables that maps onto a value that is no longer present in the plurality of data sources, identified while monitoring the data changes.

24. The method of claim 17, wherein the updating the data further comprises:
    notifying a system administrator regarding the data changes; and
    updating the one or more value lookup tables, based on the data changes.

25. The method of claim 1, wherein the updating the mappings comprises updating the logic corresponding to the mappings, the updating the logic comprising:
    refreshing statistical data of the existing plurality of binding conditions;
    identifying the number of mismatches in the existing plurality of binding conditions, based on the refreshed statistical data;
    comparing the number of mismatches to a predefined threshold value;
    notifying a system administrator, if the number of mismatches exceeds the predefined threshold value;
    re-discovering a plurality of binding conditions, if the number of mismatches exceeds the predefined threshold value; and
    re-determining a plurality of transformation functions, based on the re-discovered plurality of binding conditions.

26. The method of claim 1, wherein the updating the mappings comprises updating the logic corresponding to the mappings, the updating the logic comprising:
    refreshing statistical data of the existing plurality of transformation functions;
    identifying the number of mismatches in the existing plurality of transformation functions, based on the refreshed statistical data;
    comparing the number of mismatches to a predefined threshold value;
    notifying a system administrator, if the number of mismatches exceeds the predefined threshold value; and
    re-discovering a plurality of transformation functions, if the number of mismatches exceeds the predefined threshold value.

27. A system for automating a process of data mapping by generating a Global Data Object (GDO) to consolidate a plurality of Local Data Objects (LDOs) into a single integrated data model to facilitate data retrieval from a plurality of data sources, the system comprising:
  a data mapper, the data mapper being embodied in the form of a computer system, the computer system including a programmed microprocessor, wherein the data mapper is configured for:
  determining a plurality of binding conditions between each LDO the plurality of LDOs and the GDO, wherein the plurality of binding conditions are identification relationships between LDO instances and GDO instances, the GDO is the integrated data model representing relationships between the plurality of LDOs, and each LDO from the plurality of LDOs is a logical representation of relationships between a plurality of tables in a data source of the plurality of data sources;
  determining a plurality of transformation functions for transforming a plurality of LDO attributes to at least one of GDO attributes, the plurality of transformation functions being determined based on the determined plurality of binding conditions; and
  mapping the plurality of LDOs onto the GDO automatically, based on the determined plurality of binding conditions and the determined plurality of transformation functions;
  updating the mappings of the plurality of LDOs onto the GDO by monitoring changes in schemas of the plurality of LDOs and the GDO automatically; and
  a plurality of data management systems, the plurality of data management systems being connected with the data mapper.

28. A computer program product for use with a computer, the computer program product comprising a computer usable medium having a computer readable program code embodied therein for automating a process of data mapping by generating a Global Data Object (GDO) to consolidate a plurality of Local Data Objects (LDOs) into a single integrated data model to facilitate data retrieval from a plurality of data sources, the computer readable program code comprising:
  program code for determining a plurality of binding conditions between each LDO the plurality of LDOs and the GDO, wherein the plurality of binding conditions are identification relationships between LDO instances and GDO instances, the GDO is the integrated data model representing relationships between the plurality of LDOs, and each LDO from the plurality of LDOs is a logical representation of relationships between a plurality of tables in a data source of the plurality of data sources;
  program code for determining a plurality of transformation functions for transforming a plurality of LDO attributes to at least one of GDO attributes, the plurality of transformation functions being determined based on the determined plurality of binding conditions;
  program code for mapping the plurality of LDOs onto the GDO automatically, based on the determined plurality of binding conditions and the determined plurality of transformation functions; and
  program code for updating the mappings of the plurality of LDOs onto the GDO by monitoring changes in schemas of the plurality of LDOs and the GDO automatically.

29. A method for automating a process of data mapping by a data mapper, the data mapping being performed by generating a Global Data Object (GDO) to consolidate a plurality of Local Data Objects (LDOs) into a single integrated data model to facilitate data retrieval from a plurality of data sources, the method comprising:
  determining a plurality of binding conditions between each LDO from the plurality of LDOs and the GDO, wherein the plurality of binding conditions are identification relationships between LDOs instances and GDO instances, the GDO is the integrated data model representing relationships between the plurality of LDOs, and each LDO from the plurality of LDOs is a logical representation of relationships between a plurality of tables in a data source of the plurality of data sources;
  determining a plurality of transformation functions for transforming a plurality of LDO attributes to at least one of GDO attributes, the plurality of transformation functions being determined based on the determined plurality of binding conditions;
  deriving a first transformation function for transforming the at least one of the GDO attributes to at least one of the plurality of LDO attributes, wherein the first transformation function is automatically derived from a invertible second transformation function, wherein the invertible second transformation function transforms at least one of the LDO attributes to at least one of the GDO attributes and is one of the plurality of transformation functions; and
  mapping the GDO onto the plurality of LDOs automatically, based on the determined plurality of binding conditions and the first transformation function derived from the invertible second transformation function,
  wherein the data mapper is embodied in the form of a computer system, the computer system including a programmed microprocessor.

30. The method of claim 29, wherein the mappings are updated automatically.

31. The method of claim 29, wherein the mappings are updated by monitoring changes in schemas of the plurality of data sources by using schemabots.

32. A method for automating a process of data mapping by a data mapper, the data mapping being performed by generating a Global Data Object (GDO) to consolidate a plurality of Local Data Objects (LDOs) into a single integrated data model to facilitate data retrieval from a plurality of data sources, the method comprising:
  determining a plurality of binding conditions between each LDO from the plurality of LDOs and the GDO, wherein the plurality of binding conditions are identification relationships between LDOs instances and GDO instances, the GDO is the integrated data model representing relationships between the plurality of LDOs, and each LDO from the plurality of LDOs is a logical representation of relationships between a plurality of tables in a data source of the plurality of data sources;
  determining a plurality of transformation functions for transforming a plurality of LDO attributes to at least one of GDO attributes, the plurality of transformation functions being determined based on the determined plurality of binding conditions;
  determining a transformation function for transforming the at least one of the GDO attributes to at least one of LDO attribute from the plurality of LDO attributes, based on the determined plurality of binding conditions, the transformation function being determined for the at least one LDO attribute that does not have an invertible function onto the at least one of the GDO attributes; and
  mapping the GDO onto the plurality of LDOs automatically, based on the determined plurality of binding conditions, wherein the data mapper is embodied in the form of a computer system, the computer system including a programmed microprocessor.

33. The method of claim 32, wherein the mappings are updated automatically.

34. The method of claim 32, wherein the mappings are updated by monitoring changes in schemas of the plurality of data sources by using schemabots.

* * * * *